United States Patent [19]

Oguma et al.

[11] Patent Number: 4,529,072
[45] Date of Patent: Jul. 16, 1985

[54] AUTOMATIC CLUTCH CONTROL SYSTEM

[75] Inventors: Tomio Oguma, Anjyo; Kouichiro Hirosawa, Kariya; Tsutomu Mitsui, Chiryu, all of Japan

[73] Assignee: Aisin Seiki Kabushikikaisha, Kariya, Japan

[21] Appl. No.: 357,535

[22] Filed: Mar. 12, 1982

[30] Foreign Application Priority Data

Mar. 27, 1981 [JP] Japan ................................ 56-45320

[51] Int. Cl.³ .............................................. B60K 41/28
[52] U.S. Cl. ............................... 192/0.052; 192/0.076; 192/0.092; 192/3.58
[58] Field of Search ............... 192/0.052, 0.075, 0.076, 192/0.092, 0.096, 3.58, 103 R, 0.033; 74/866

[56] References Cited

U.S. PATENT DOCUMENTS

| | | | |
|---|---|---|---|
| 3,645,366 | 2/1972 | Numazawa et al. | 192/0.092 X |
| 3,752,284 | 8/1973 | Brittain et al. | 192/0.052 X |
| 4,081,065 | 3/1978 | Smyth et al. | 192/0.076 |
| 4,343,387 | 8/1982 | Hofbauer | 192/0.092 X |

*Primary Examiner*—George H. Krizmanich
*Attorney, Agent, or Firm*—Sughrue, Mion, Zinn, Macpeak, and Seas

[57] ABSTRACT

A system is provided which controls the pressure with which a clutch engages, utilizing a slip rate of the clutch which is equal to the ratio of the rotational speed of the output shaft to the rotational speed of the drive shaft thereof as a main parameter. A microprocessor reads a throttle opening and the slip rate at a time interval of 0.4 sec from the initiation of the clutch engagement, and accesses a particular group of clutch engagement controlling data which correspond to the time $l$ elapsed and to these parameters. The controlling signals of the particular group are sequentially outputted to the clutch energizing device at a subinterval of 0.05 sec during the time interval of 0.4 sec. The interval changes from $l=0$ to $l=8$ at maximum, from the initiation to the completion of the clutch engagement. Each interval $l=0$ to $l=8$ corresponds to 0.4 sec. Whenever a temporary clutch activation is instructed, the microprocessor increases the subinterval of 0.05 sec to 0.1 sec and the time interval $l$ to 0.8 sec. The value of $l$ is incremented by one after a time length of either 0.4 or 0.8 sec elapses.

5 Claims, 30 Drawing Figures

Fig. 3e Con't
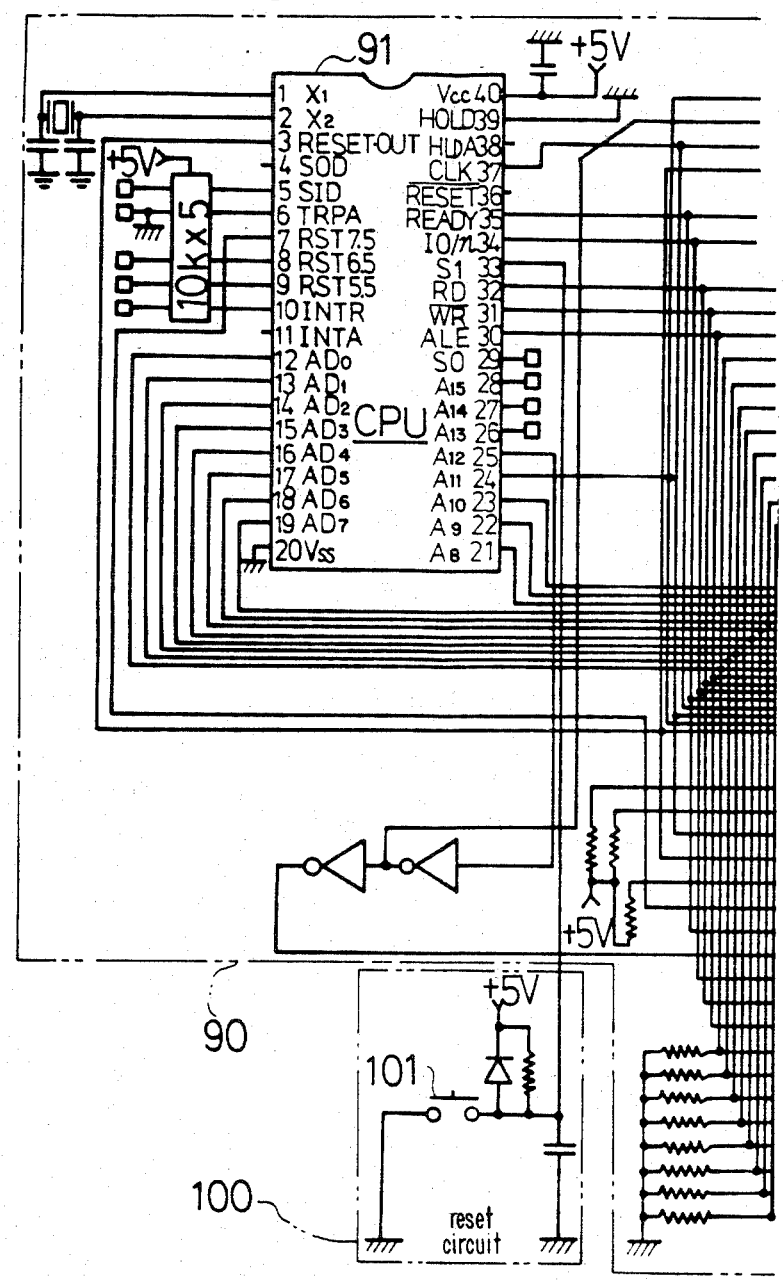

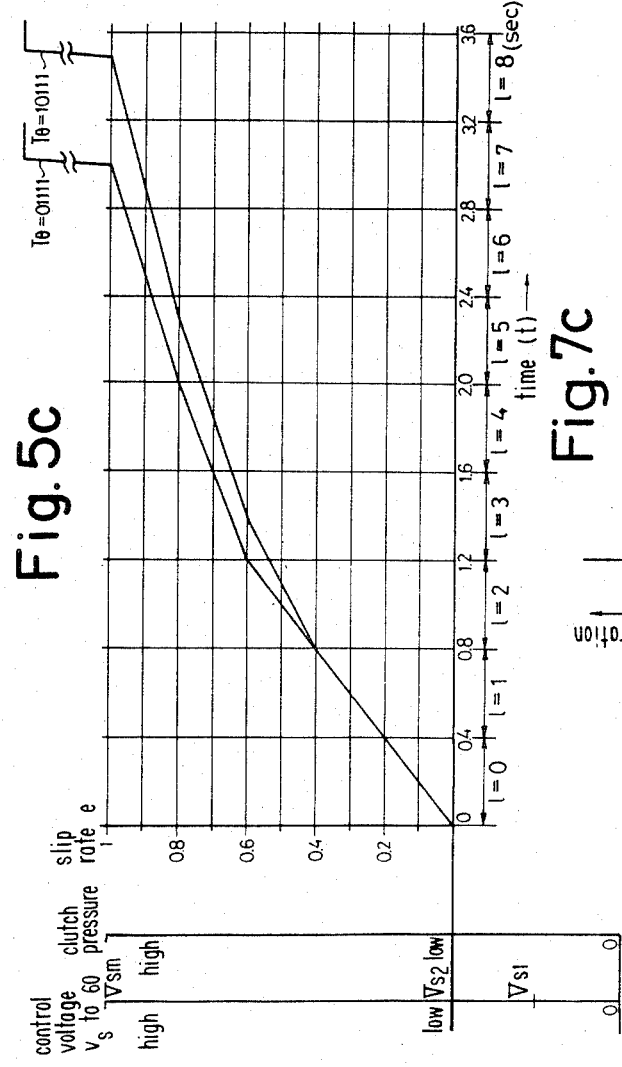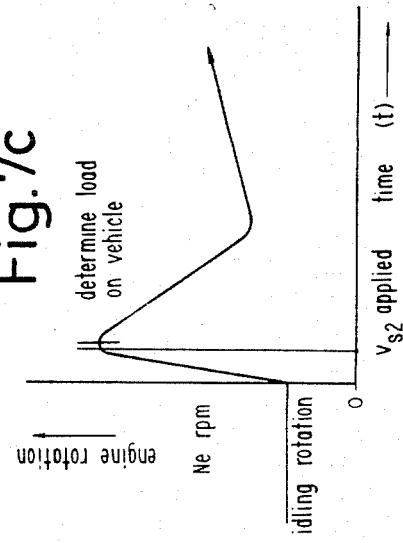

AUTOMATIC CLUTCH CONTROL SYSTEM

BACKGROUND OF THE INVENTION

The invention relates to an automatic clutch controls system which automatically control the coupling of a driven shaft to a drive shaft in a clutch mounted on an automobile in accordance with a decision rendered by an electronic unit.

In a conventional automatic clutch arrangement, the degree of engagement of the clutch is determined in an analog manner in accordance with the number of revolutions of an engine only upon starting, but an on-and-off control of the clutch is employed during a subsequent shift operation which occurs after the vehicle has been started. Consequently, if there is a difference between the number of revolutions of the engine and the number of revolutions of the clutch to cause a sudden complete engagement of the clutch, a driver of the vehicle may experience an uncomfortable shock. To alleviate this, a variable rate is employed for engagement of the clutch, since the magnitude of a negative pressure prevailing in an engine manifold allows the differential number of revolutions to be known. However, the technique suffers from a disadvantage that an accurate control cannot be achieved since the magnitude of the negative pressure changes from vehicle to vehicle and because a long time delay is involved.

To accomodate for this difficulty, an arrangement has been proposed to achieve an accurate engagement of a clutch without experiencing a shock in a clutch arrangement in which a clutch transmits rotating power to an output shaft. The arrangement comprises a power sensor for detecting the number of revolutions of the output shaft, a clutch sensor for detecting the number of revolutions of the clutch, a comparator for determining the relative magnitude of the number of revolutions of both sensors, a parameter of follow-up control responsive to an output from the comparator to activate the clutch for engagement as the number of revolutions of the output shaft increases whenever the number of revolutions of the output shaft is higher than that of the clutch, and an automatic engaging circuit responsive to an output from the comparator and operating whenever the number of revolutions of the clutch is higher to deactuate the follow-up control and to terminate automatically the engagement of the clutch within a given time interval. In this manner, the relative magnitude of the number of revolutions of the engine and the clutch is determined in an electrical manner, and whenever the number of revolutions of the engine is higher than that of the clutch, an engagement of the clutch occurs in response to the number of revolutions of the engine while whenever the number of revolutions of the engine is lower than that of the clutch, an engagement of the clutch takes place in accordance with a difference therebetween. (See Japanese Patent Publication No. 26,020/1978, filed Mar. 26, 1971 and published July 31, 1978). In other words, the rotational speed of the engine is chosen as a main variable while a differential speed between the output shaft of the clutch (driven shaft) and the output shaft of the engine (the clutch drive shaft) is chosen as a parameter for controlling the clutch coupling power. To summarize, in a mode in which the vehicle is driven for running under the engine power, the clutch coupling power is controlled in a manner corresponding to the rotational speed of the engine while in an engine brake mode, the clutch coupling power is controlled as a particular function of time. Consequently, the slip rate of the clutch depends on the rotational speed of the engine, and the correlation between the engine power and a load on the vehicle may not be proper. To achieve a proper engagement of a clutch for various running conditions of a vehicle, it is preferred that the slip rate of the clutch correspond to the running condition of the vehicle.

SUMMARY OF THE INVENTION

It is a first object of the invention to provide an automatic clutch control system which controls the engagement of a clutch in accordance with the slip rate of the clutch and as a function of the running condition of a vehicle. A second object is to provide an automatic clutch control system which controls the clutch engagement in accordance with an engine power and a loading on the vehicle, and a third object is to provide an automatic clutch control system which enables a smooth and proper clutch engagement in accordance with the running condition of a vehicle and the engine power.

The above objects are accomplished in accordance with the invention by controlling the clutch engagement as a function of an actual slip rate of the clutch, namely, the ratio of the rotational speed of the drive shaft to the rotational speed of the driven shaft of the clutch. Specifically, a target slip rate is determined as a function of an actual slip rate, and the actual slip rate is determined at a given time interval to derive the corresponding target slip rate, and a clutch controlling signal is applied to clutch controlling and energizing means which is capable of achieving the specified target slip rate.

In a preferred manner of carrying out the present invention, a throttle opening which can be related to an engine power is utilized to change the correlation between the target slip rate and the actual slip rate. Thus, the actual slip rate and the throttle opening are detected at a given time interval, and both of them are used to specify a particular target slip rate. A clutch controlling signal is applied to the clutch controlling and energizing means which is capable of achieving the specified target slip rate.

It will be seen that the combinations of the engine power (throttle opening) and the actual slip rate are innumerable because both of them are analog in nature. To enable an electronic control, both of them must be quantized to assume values in a plurality of zones. Nevertheless, there are an increased number of combinations of the throttle opening and the actual slip rate. It is preferred that the slip rate be changed at a rate dependent on the correlation between the engine power and a running condition of the vehicle so that the rate is low when the engine power is low and the loading on the vehicle is high while the rate is high when the engine power is high and the loading on the vehicle is low. Accordingly, in a preferred embodiment of the invention, the clutch controlling signal which is specified at a given time interval comprises a group or a set of clutch controlling signals which are specified during subintervals which represent a time division of the time interval. When a particular group of controlling signals is specified, the controlling signals belonging to the particular group are sequentially addressed at the time subinterval for application to the clutch controlling and energizing means. In this manner, a proper rate of change of the slip rate is determined at the given time interval as a function of the actual slip rate or the actual slip rate and the throttle opening. It will be seen that the actual slip rate at a given time and the number of times the given time interval has been repeated, or the clutch controlling signal has been changed by that time, correspond to the prevailing value of the engine power and the loading on the vehicle. It then follows that a particular group of clutch controlling signals which is specified next has a rate of change of the slip rate which is proper to these parameters. In this manner, by changing the group of clutch controlling signals at a given time interval, a smooth control of the clutch engagement is achieved. As the number of times the groups of clutch controlling signals are changed increases, or as the time passes since the initiation of controlling the clutch engagement, the actual slip rate successively increases, and accordingly, the target slip rate also increases in a sequential manner. Thus, a reduced number of groups of clutch controlling signals may be used. Therefore, if a particular group of clutch controlling signals is specified in terms of the actual slip rate and the throttle opening, the required number of groups of controlling signals is far less than the number of zones of the slip rate, multiplied by the number of zones of a throttle opening and the number of controlling signals is changed.

BRIEF DESCRIPTION OF THE DRAWINGS

FIGS. 5a, 5b, 5c and 5d graphically show part of the data illustrated in FIG. 4 representing the data used to control starting on a flat road, starting on an up slope, starting on a very steep up slope and to control engine braking, respectively;

FIGS. 7a, 7b and 7c graphically show a change in the rotational speed Ne of the engine when starting on a flat road, on an up slope and on a very steep up slope, respectively;

DESCRIPTION OF THE PREFERRED EMBODIMENTS

Figure 1:
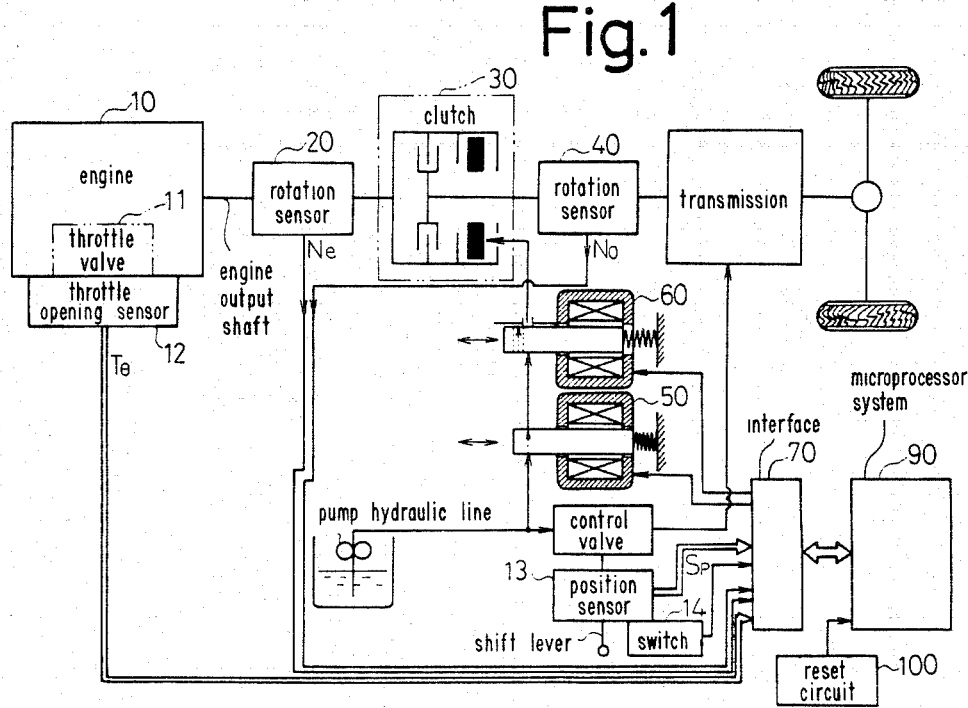
FIG. 1 is a block diagram of an embodiment of the invention, illustrating essential components used therein in combination with a vehicle.

Referring to the drawings, an embodiment of the invention will now be described. FIG. 1 is a block diagram illustrating the general arrangement of an embodiment of the invention, principally illustrating its relationship with an engine and a clutch mounted on a vehicle. Specifically, an engine 10 includes a throttle valve 11 having a rotary shaft, to which a throttle opening sensor 12 is coupled. A rotation sensor 20 is coupled to the drive shaft of a clutch 30, which represents the output shaft of the engine while another rotation sensor 40 is coupled to the driven shaft of the clutch. The clutch 30 shown comprises a wet multi-disc clutch as disclosed in U.S. Pat. Nos. 2,738,864 and 4,242,924, for example. The clutch includes a piston, to which an oil pressure is applied depending on the operative condition of a solenoid operated pressure regulator valve 60 and a switch valve 50. It is to be understood that the switch valve 50 may be omitted while using a pressure regulator valve 60 which can be controlled to its fully closed position. It is to be noted here that the clutch 30 may also be replaced by a solenoid operated clutch as disclosed in U.S. Pat. Nos. 2,774,452 and 3,249,184, for example, with the valves 50, 60 replaced by solenoid drivers. As a further alternative, any other clutch which can be electrically controlled may be used.

A shift lever which establishes a particular operational mode of a transmission is associated with a position sensor 13 which determines the established position thereof.

A detection signal from the throttle opening sensor 12, detection signals from the rotation sensors 20 and 40, and a position signal from the sensor 13 are fed to an interface (electrical processing circuit) 70 where they are amplified, waveform shaped and converted into digital versions to be applied to a microprocessor system 90. It will be noted that the interface 70 is also connected to a manual switch 14 which instructs a temporary clutch activation as when the traffic on the road is congested. Its status signal is applied to the microprocessor system 90.

The microprocessor system 90 includes a semiconductor read only memory (ROM or PROM) storing groups of clutch controlling signals. It reads the number of revolutions Ne of the clutch drive shaft, the number of revolutions No of the driven shaft, the throttle opening $T\theta$, the shift lever position Sp and the like in order to access the memory to read out clutch controlling data, which is supplied to the interface 70 to control the pressure regulator valve 60.

Figure 2:
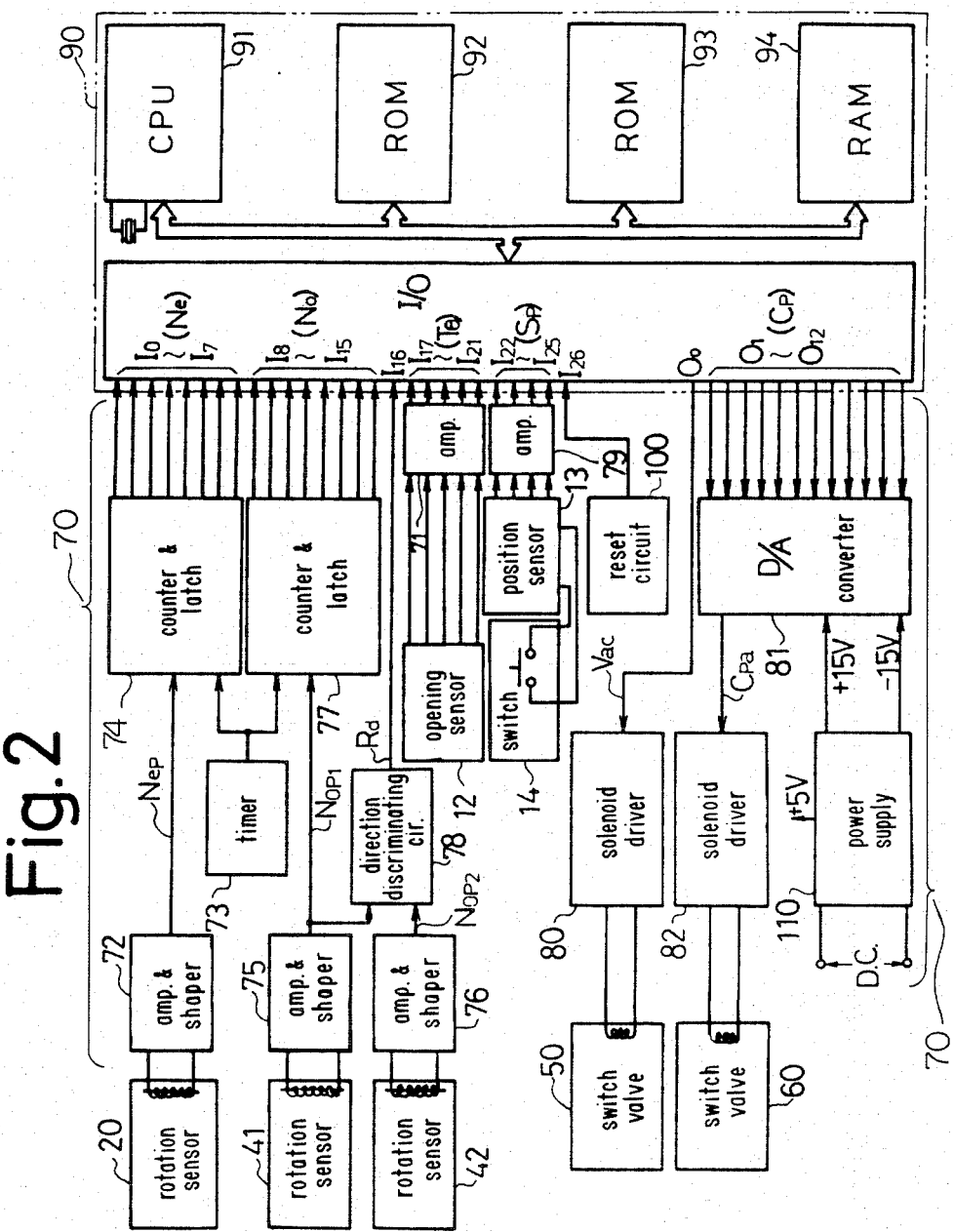
FIG. 2 is a block diagram showing the general arrangement of the embodiment in more detail.

FIG. 2 shows the general arrangement of one embodiment of the invention while FIGS. 3a to 3e show the details of various parts. First, referring to FIGS. 2 and 3a, a system for detecting the rotational speed of the drive shaft of the clutch will be described. The clutch drive shaft fixedly carries a permanent magnet gear having a plurality of teeth formed along its periphery, with adjacent teeth being magnetized to opposite polarities. A core of a magnetizable material is disposed in opposing relation with the teeth and carries a sensor coil thereon, the assembly forming the rotation sensor 20. As the magnet gear rotates, an alternating voltage is induced in the sensor coil, and is applied to amplifier and waveform shaper circuit 72 of the interface 70. The circuit 72 includes a first operational amplifier OP1 which inverts and amplifies the input alternating voltage, a second operational amplifier OP2 which again inverts, amplifies it and shifts its level, and a first and a second transistor which convert the input into a binary signal, which is then inverted and amplified. As a result of such arrangement, there are produced speed detection pulses of a frequency and a pulse width which depend on the rotational speed of the magnet gear 20, and which are applied to a monostable multivibrator MM1. The monostable multivibrator MM1 is triggered by the rising end of the speed detection pulse to produce a pulse output of high level or "1" which has a given short duration. In this manner, the output from the monostable multivibrator MM1 represents a sequence of pulses of a given pulse width and having a frequency which is proportional to the rotational speed of the clutch drive shaft and which is indicative of the engine speed. The sequence of pulses are passed through NAND gate NA1 to be applied to a counter latch 74 of the interface 70, which comprises a pair of four bit counters CO1, CO2, and latch LA1. The sequence of pulses are counted by the counter CO1, and a carry pulse from the counter CO1 is counted by the counter CO2. In this manner, the combination of the counters CO1 and CO2 forms an 8 bit counter. The count in the counters CO1 and CO2 are used to update the content of the latch LA1 at a given time interval, whereupon the counters CO1, CO2 are cleared. Therefore, data stored in the latch LA1 represents a number of engine speed detection pulses obtained during a given period, or the rotational speed of the engine. A timer 73 controls the updating operation of the latch LA1 and the clearing operation of the counters CO1, CO2. In the timer 73, pulses produced by a pulse oscillator OSC are frequency divided by a combination of a counter CO3 and NAND gates NA2 and NA3 to form a latching instruction pulse and a counter clear pulse. The counter clear pulse is converted into a pulse of a reduced width by means of a monostable multivibrator MM2 to clear the content of the counters CO1, CO2 momentarily subsequent to activating or updating the latch LA1.

Figure 3C:
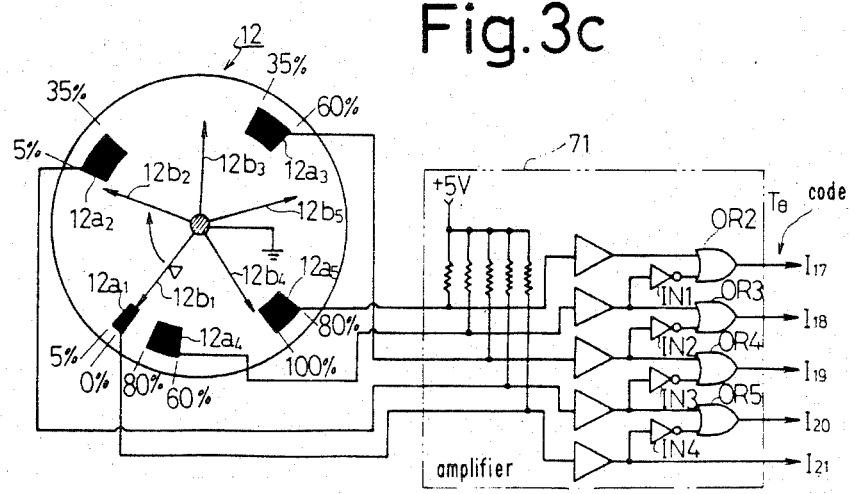
FIGS. 3a, 3b, 3c, 3d and 3e are circuit diagrams showing the detail of individual components shown in block form in FIG. 2.
Figure 3A:
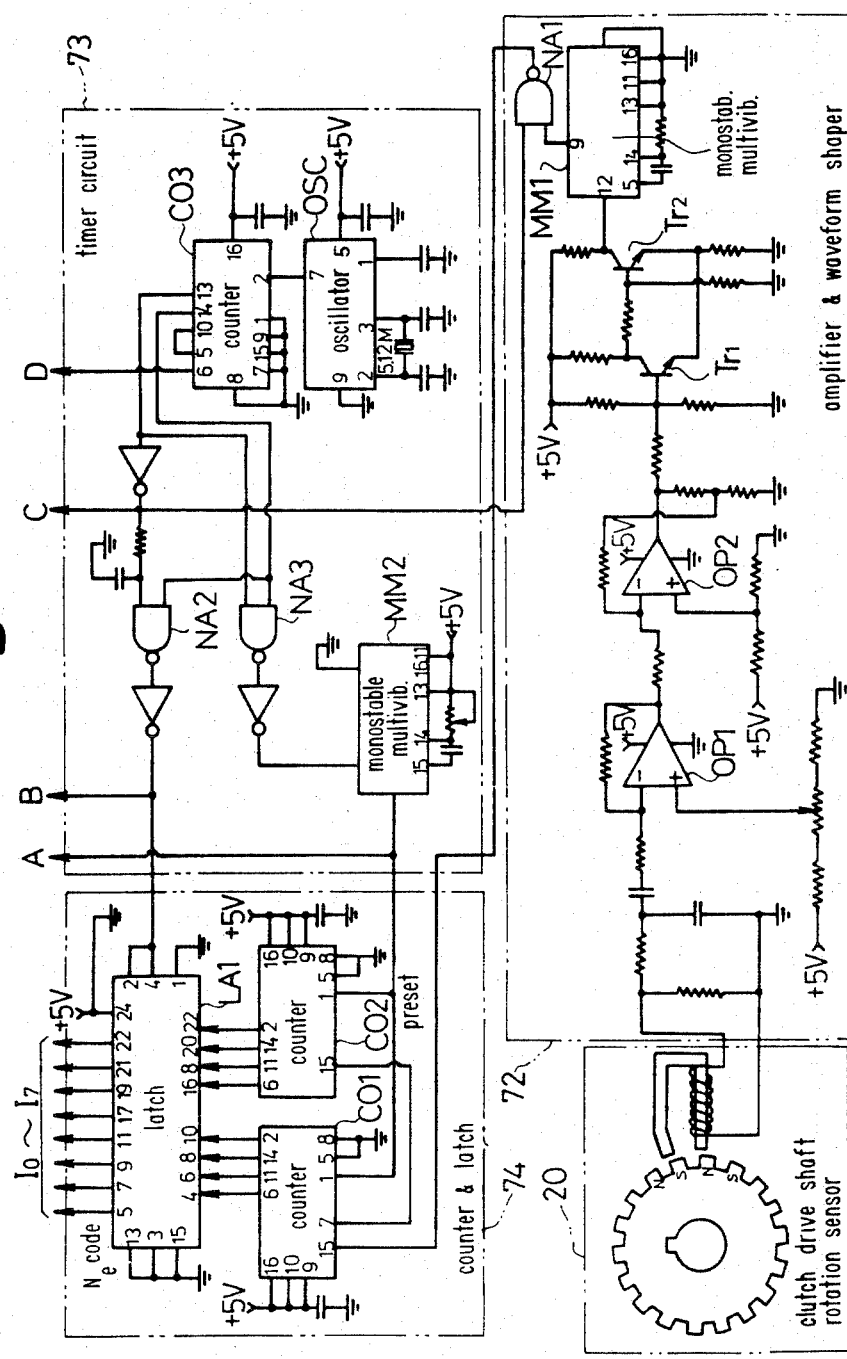
Figure 3B:
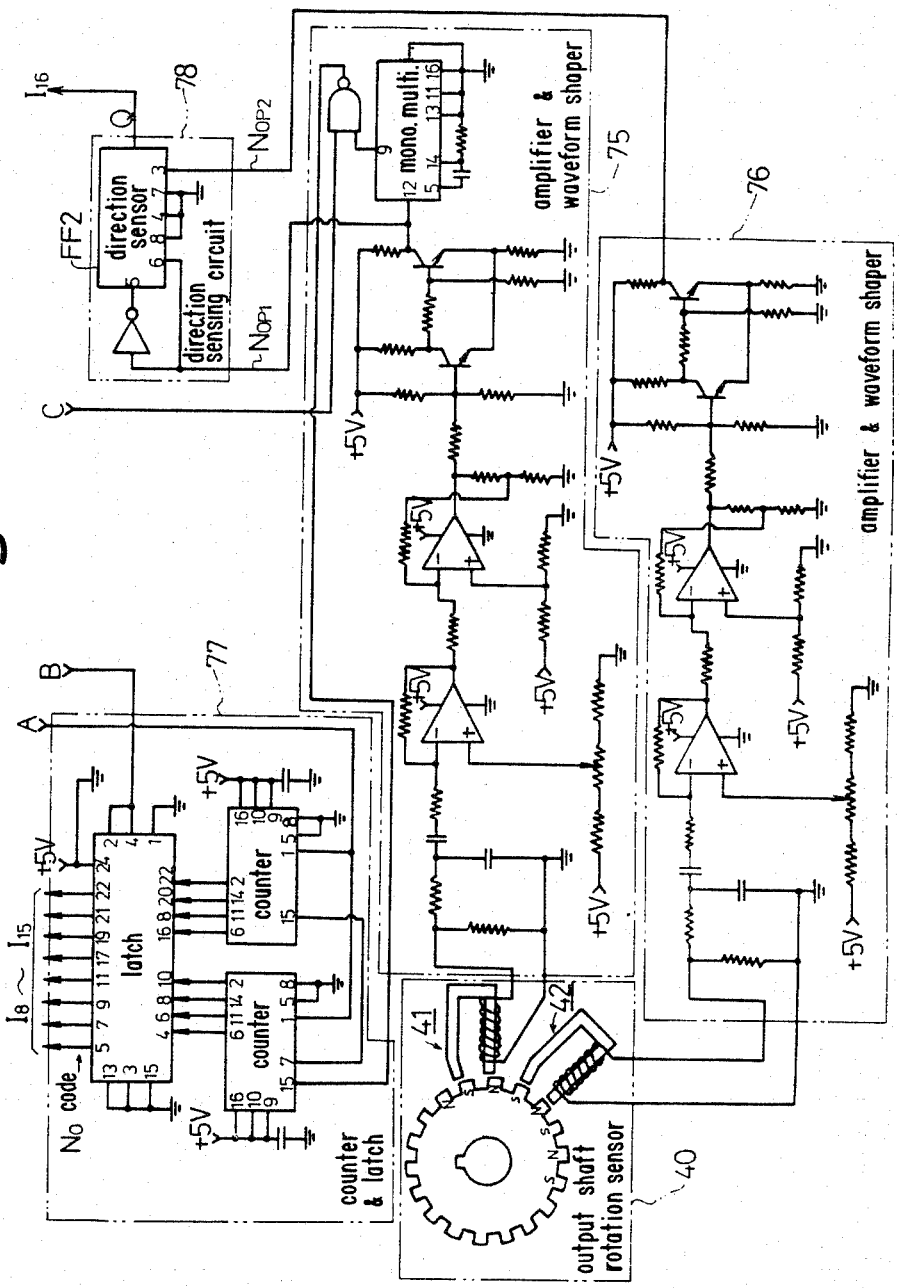

Referring to FIGS. 2 and 3b, a system for detecting the rotational speed of the driven shaft of the clutch as well as a system for detecting the direction of rotation of the driven shaft of the clutch will now be described. The driven shaft of the clutch includes a permanent magnet gear which is similar to that provided in the rotation sensor 20, and also includes a pair of cores 41, 42 of a magnetizable material each carrying a detection coil thereon and which are disposed in opposing relationship with the gear. The cores are disposed so that voltages induced in the respective detection coils have a phase difference of $\pi/2$ therebetween. These induced voltages are applied to amplifier and waveform shaper circuits 75, 76, respectively. The circuit 75 is arranged in the same manner as the circuit 72 mentioned before while the circuit 76 is similar to the circuit 72, except that the monostable multivibrator MM1 is omitted therefrom. The output pulses from the circuit 75, representing the rotational speed of the driven shaft of the clutch, are applied to a counter and latch circuit 77, which is constructed in the same manner as the counter and latch circuit 74. As before, the circuit 77 receives a latching instruction pulse and a counter clear pulse which are the same as those applied from the timer 73 to the circuit 74. In this manner, data stored in the latch represents the rotational speed of the driven shaft of the clutch. Pulses Nop1, Nop2 from the circuits 75, 76 have a phase difference of $\pi/2$ therebetween, and are applied to a direction discriminating element FF2 of a direction of rotation discriminating circuit 78. Specifically, the element FF2 is formed by a J-K flipflop, and produces a low level or "0" output when the driven shaft rotates in a direction corresponding to the forward direction of the vehicle and produces a high level or "1" output when the driven shaft rotates in a direction corresponding to the reverse direction of the vehicle, in accordance with a phase difference between the pulses Nop1, Nop2.

FIG. 3c shows the general construction of the throttle opening sensor 12 and a processing circuit 71, representing a part of the interface 70, which processes a detection signal from the sensor 12. The throttle opening sensor 12 includes a printed substrate on which five electrodes $12a_1$-$12a_5$ are formed. The sensor 12 includes a rotary shaft connected electrically to the ground and also connected to the rotary shaft of the throttle valve and fixedly carrying a slider electrode having five radially extending brush arms $12b_1$-$12b_5$. A rotation of the throttle valve corresponding to an opening from 0% to 100% is limited within 360°/5, and accordingly, the brush arms $12b_1$-$12b_5$ are angularly spaced apart from each other by 360°/5. A first electrode $12a_1$ has a width which enables its contact with a first arm $12b_1$ to be maintained as the opening lies within an extent less than 0% to 5%. A second electrode $12a_2$ has a width which enables its contact with a second arm $12b_2$ to be maintained for an opening within an extent from less than 5% to 35%. A third electrode $12a_3$ has a width which enables its contact with a third arm $12b_3$ to be maintained for an opening within an extent from less than 35% to 60%, a fourth electrode $12a_4$ has a width which enables its contact with a fourth arm $12b_4$ to be maintained for an opening within an extent from less than 60% to 80%, and a fifth electrode $12a_5$ has a width which enables its contact with a fifth arm $12b_5$ to be maintained for an opening within an extent from less than 80% to or above 100%. To avoid a condition that none of the arms $12b_1$-$12b_5$ contacts either electrode $12a_1$-$12a_5$, an arrangement is made so that arms $12b_1$ and $12b_2$ contact the electrodes $12a_1$ and $12a_2$, respectively, at an opening of 5% including a slightly lesser opening, the arms $12b_2$ and $12b_3$ contact the electrodes $12a_2$ and $12a_3$, respectively, at an opening of 35% including a slightly lesser opening, the arms $12b_3$ and $12b_4$ contact the electrodes $12a_3$ and $12a_4$, respectively, for an opening of 60% including a slightly lesser opening, and the arms $12b_4$ and $12b_5$ contact the electrodes $12a_4$ and $12a_5$, respectively, for an opening of 80% including a slightly lesser opening. As a consequence, two electrodes may assume a ground level simultaneously. To enable an opening detection signal to be uniquely defined under such condition, the processing circuit 71 is arranged such that the potential assumed by the electrodes $12a_1$-$12a_5$ is applied, after amplification, to OR gates OR2-OR5 both directly and through inverters IN1-IN4 so that a detection signal corresponding to a lower opening is initially outputted. Table 1 below indicates a throttle opening detection code corresponding to a particular value of throttle opening $T\theta$ (%).

TABLE 1

| throttle valve opening $T\theta$ (%) | $T\theta$ code | | | | |
|---|---|---|---|---|---|
| | $I_{17}$ | $I_{18}$ | $I_{19}$ | $I_{20}$ | $I_{21}$ |
| $T\theta \leq 5$ | 1 | 1 | 1 | 1 | 0 |
| $5 < T\theta \leq 35$ | 1 | 1 | 1 | 0 | 1 |

TABLE 1-continued

| throttle valve opening Tθ (%) | Tθ code | | | | |
|---|---|---|---|---|---|
| | $I_{17}$ | $I_{18}$ | $I_{19}$ | $I_{20}$ | $I_{21}$ |
| 35 < Tθ ≦ 60 | 1 | 1 | 0 | 1 | 1 |
| 60 < Tθ ≦ 80 | 1 | 0 | 1 | 1 | 1 |
| 80 < Tθ | 0 | 1 | 1 | 1 | 1 |

Note: "0" represents a low level and "1" a high level.

Figure 3D:
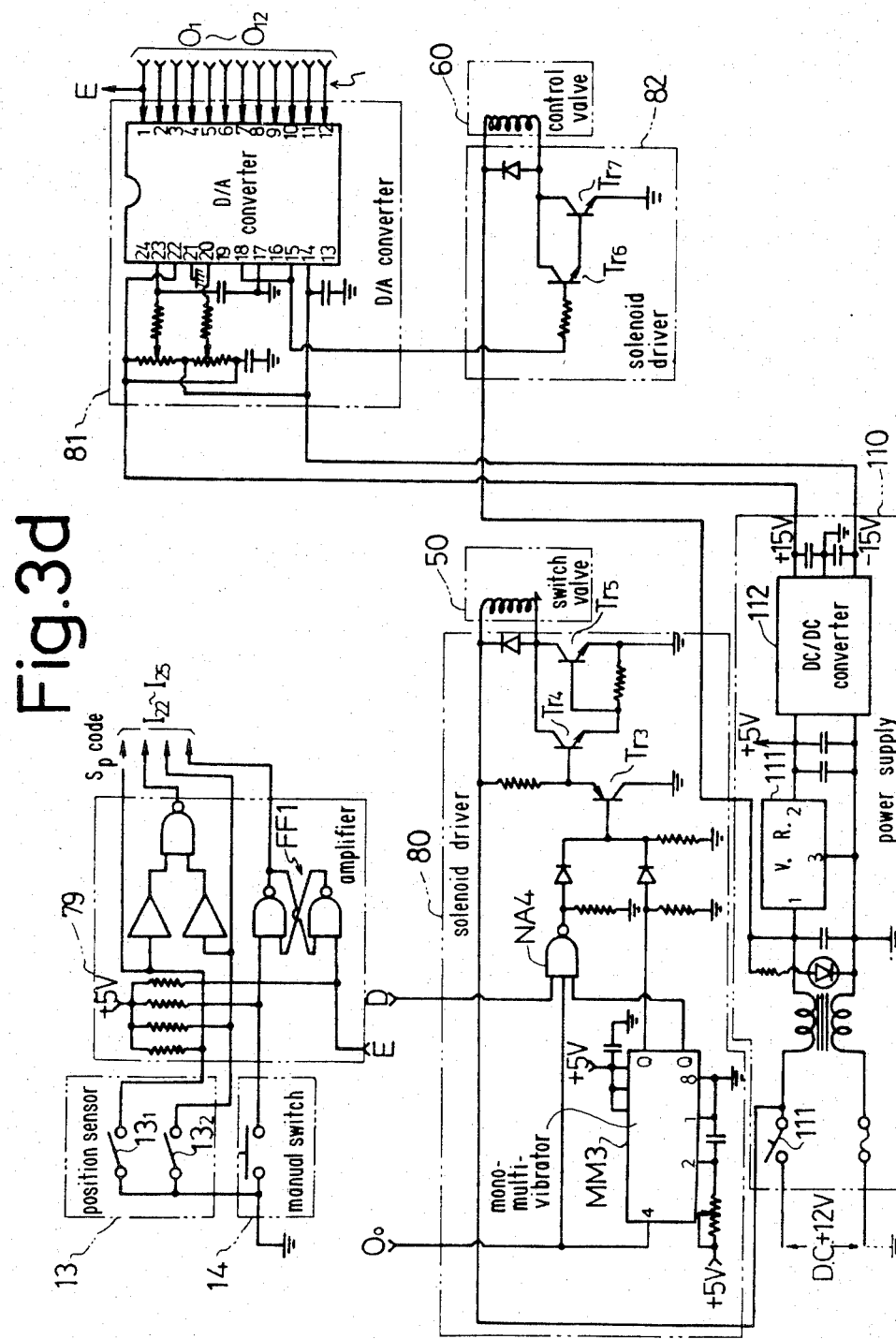

Referring to FIG. 3d, a system for detection of the position of the shift lever will be described. The shift lever position sensor 13 comprises a switch $13_1$ which is closed at the neutral position N, and another switch $13_2$ which is closed at the reverse position R. These switches are connected to an amplifier 79 of the interface 70. The manual switch 14 which is used to prolong the temporary clutch activation is connected to a flipflop FF1. The relationship between the opening and the closing of these switches and the status code is indicated in Table 2 below. It is to be noted that the flipflop FF1 is set in response to the closure of the switch 14 and is reset by the microprocessor unit 90.

TABLE 2

| shift lever position | switches | | | Sp code | | | |
|---|---|---|---|---|---|---|---|
| | $13_1$ | $13_2$ | 14 | $I_{22}$ | $I_{23}$ | $I_{24}$ | $I_{25}$ |
| neutral N | closed | x | x | 0 | 1 | 1 | 1 |
| drive D | x | x | x | 1 | 0 | 1 | 1 |
| reverse R | x | closed | x | 1 | 1 | 0 | 1 |
| manual set | x | x | momentarily closed | 1 | 1 | 1 | 0 |

Note: "0" represents a low level while "1" a high level, and the mark "x" represents an open condition.

The remainder of the interface 70, namely, a solenoid driver 80 which controls the energization of the switch valve 50, a D/A converter 81 and another solenoid driver 82 which controls the energization of the pressure regulating valve 60 will now be described with reference to FIG. 3d. The microprocessor unit 90 produces a clutch control signal on its output ports $O_0$–$O_{12}$ where it is latched. The signal appearing on the port $O_0$ represents a controls signal which control the opening or closing of the switch valve 50; the signal appearing on the port $O_1$ represents a reset control signal for the flipflop FF1; and signals appearing on other ports $O_2$–$O_{12}$ represent control signals for the pressure regulating valve or data controlling the energization of the clutch. In the solenoid driver 80, the valve control signal $O_0$ is applied to a monostable multivibrator MM3 and also to NAND gate NA4, which also receives a timing pulse D from the timer 73 (FIG. 3a) and $\overline{Q}$ output from the monostable multivibrator MM3. When the signal $O_0$ assumes a high level or "1" indicating that the valve 50 is to be opened, the $\overline{Q}$ output of the monostable multivibrator MM3 remains at its low level or "0" during a subsequent period which is preset with this multivibrator, whereby the output from NAND gate NA4 continuously assumes a high level or "1", thus maintaining a transistor Tr3 off. At this time, both transistors Tr4 and Tr5 conduct to permit a solenoid associated with the valve 50 to be continuously energized. Consequently, the plunger of the valve 50 is strongly driven in a direction to open the valve, thus opening the valve 50. When the $\overline{Q}$ output from the monostable multivibrator MM3 returns to its high level or "1" after the given period, the output from the gate NA4 varies between its high and low levels in accordance with the timing pulse D. It is to be noted that the level variation has a duty cycle of 50%. In this manner, the transistor Tr5 is repeatedly turned on and off in synchronized relationship with the level variation of the timing pulse D, whereby the current flow through the solenoid of the valve 50 as average over the time is reduced to one-half its previous value. However, because the plunger of the valve 50 has moved to its open position and is maintained in contact with the attracting yoke, it remains in its valve open position. In other words, the level of energization of the solenoid is increased during the initial phase of driving the plunger so as to provide an increased magnitude of drive force while the energization level is reduced to suppress the heating of the solenoid after the valve has been driven to its open condition. The solenoid driver 82 receives an analog energization signal from the D/A converter 81, as instructed by the clutch control code (hereafter referred to as Cp code). A transistor Tr6 controls the conduction of another transistor Tr7 in accordance with the level of the analog signal. Accordingly, there occurs a current flow through a solenoid associated with the pressure regulating valve 60, of a level as instructed by the Cp code. The plunger of the valve 60 having a throttle opening remains at the position which corresponds to the energization level of the solenoid.

FIG. 3d also shows a power supply unit 110. As shown, a main battery mounted on the vehicle supplies a d.c. voltage of 12 V, which is stepped down to and maintained at a constant value of 5 V by means of a constant voltage element 111. This voltage is then stepped up to a value of 30 V by a DC/DC converter 112, which has a center tap, located at a voltage level of 15 V, which is connected to the ground, thus supplying ±15 V to the D/A converter 81.

Figure 3E:
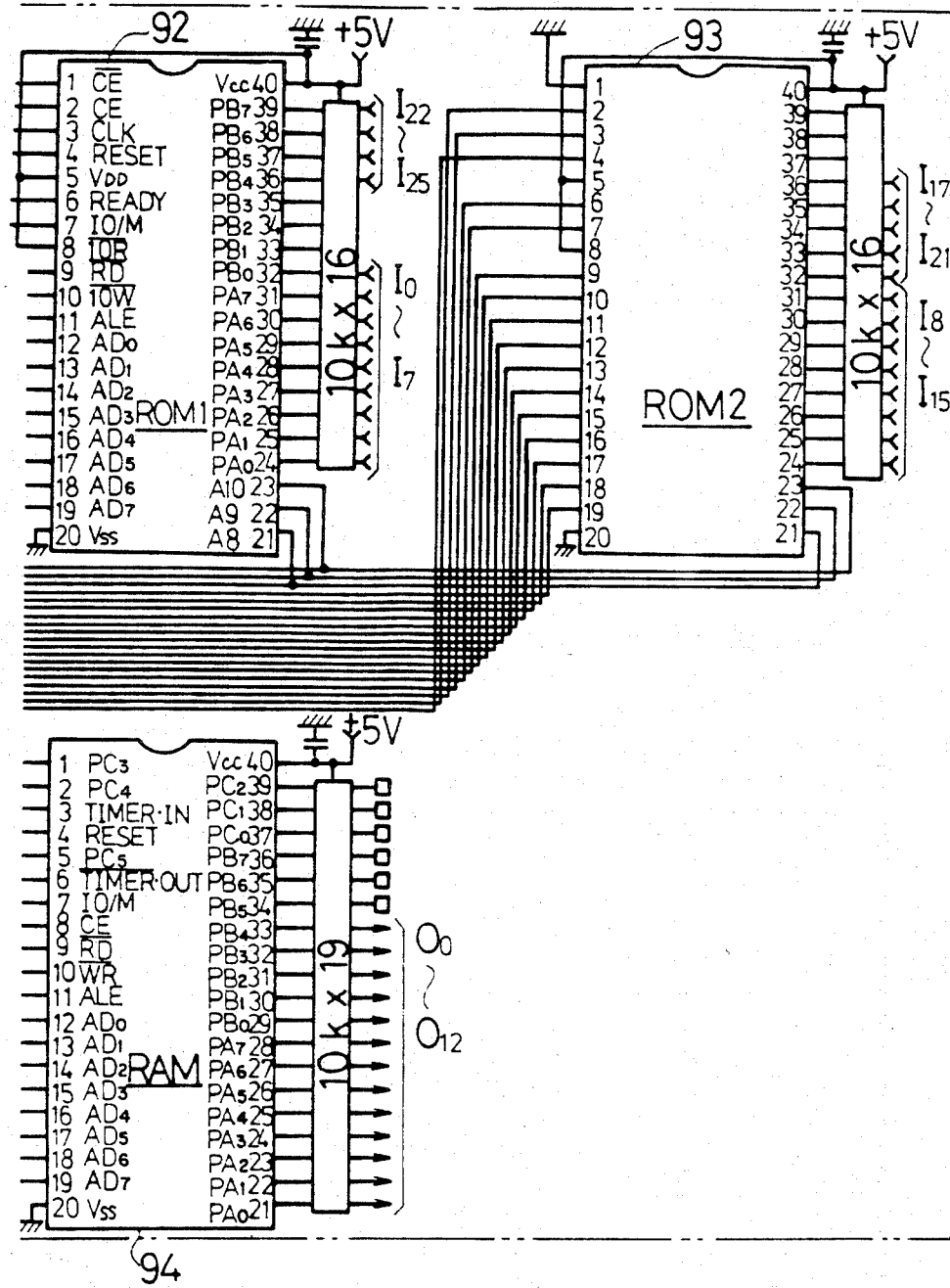

FIG. 3e shows the general arrangement of the microprocessor unit 90. The unit 90 comprises a microprocessor 91 (hereafter referred to as CPU), a pair of semiconductor read only memories 92, 93 (hereafter referred to as ROM1 and ROM2) having input/output ports, and a semiconductor read-write memory 94 (hereafter referred to as RAM) having input/output ports. The unit includes a reset circuit 100 to which a voltage of 5 V is supplied. Immediately after the application of the voltage 5 V and thereafter whenever a reset switch 101 is closed, the reset circuit produces a reset signal which is applied to CPU 91. In response to the reset signal, CPU 91 effects an initialization of its input/output ports.

Principal components described above are formed by IC elements, which are specified in Table 3 below.

TABLE 3

| components | reference character | manufacturer | produce number |
|---|---|---|---|
| counter | CO1, CO2 | Motorola | MC14029B |
| counter | CO3 | " | MC14518B |
| latch | LA1 | " | MC14508B |
| monostable multivibrator | MM1, MM2 | " | MC14027B |
| monostable multivibrator | MM3 | " | MC14528B |
| direction discriminating element | FF2 | " | MC14027B |
| CPU | 91 | Intel | 8085 |
| ROM | 92, 93 | " | 8755 |
| RAM | 94 | " | 8156 |

Figure 4:
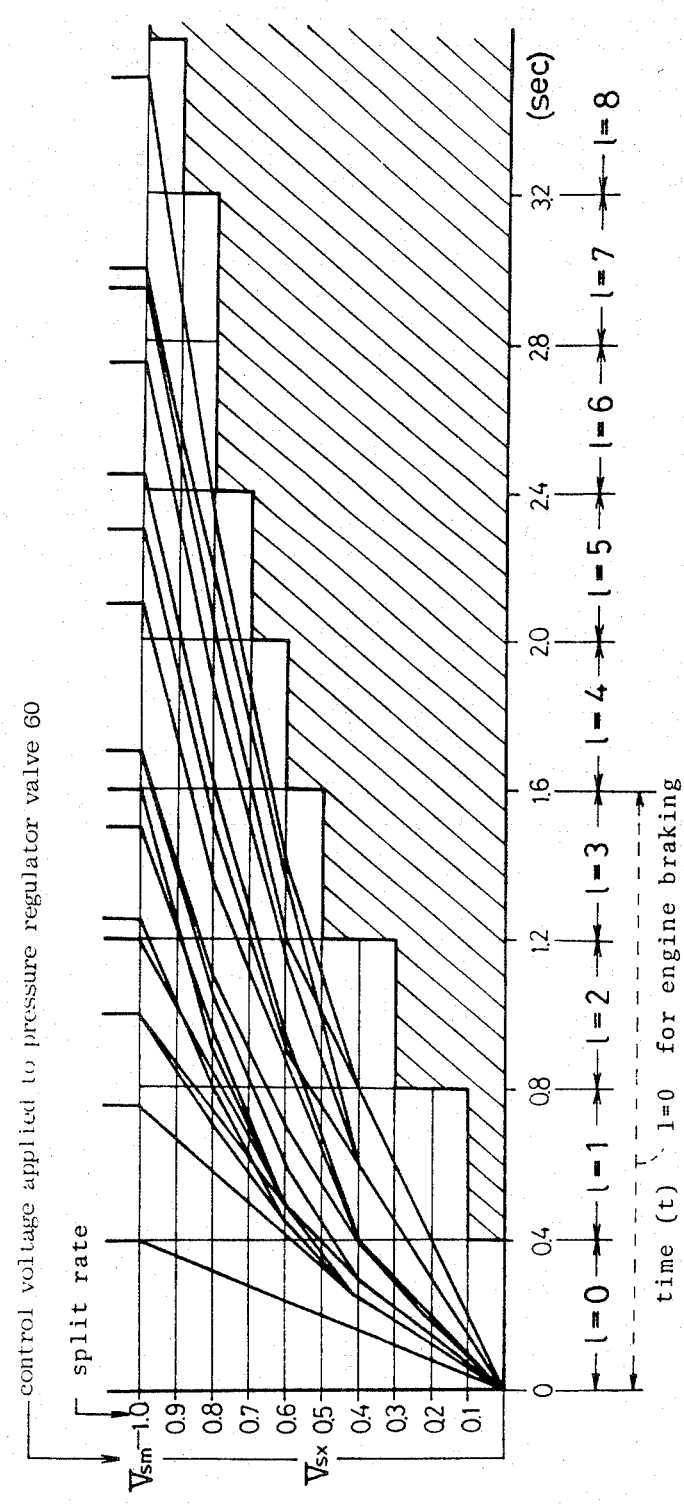
FIG. 4 graphically shows clutch controlling data which is stored in read only memories shown in FIGS. 1 and 2.

Clutch controlling programs and data for controlling the energization of the clutch are previously stored in ROM 92, 93 of the microprocessor unit 90. Data controlling the energization of the clutch will be generally described first. The clutch energization controlling data is divided into segments each having a length of 0.4 sec (l=0 to l=8), each of which is assigned with one group or several groups of clutch energization controlling data. In FIG. 4, the segment l=0 has an assignment of ten groups, the segment l=1 has an assignment of fifteen groups, ... and the segment l=8 has an assignment of a group of clutch energization controlling data. While clutch energization controlling data of each group is shown to assume a continuous value with time t in FIG. 4, it is to be understood that as indicated by dots for the segment l=0 in FIG. 5a, the interval of 0.4 second is subdivided into eight equal divisions or subintervals each having a length of 0.05 sec. In other words, a single group in each segment (l) includes eight clutch energization controlling data, each of which is read as a time length of 0.05 sec passes. Such clutch energization controlling data is stored in ROM 92 and 93, and a particular group is specified by i=1 to 9, j=1 to 4 and l=0 to 8. K=1 to 8 specifies a particular controlling data within a given group, corresponding to a point on a curve shown in FIGS. 4 and 5a. Upon starting the vehicle, l=0 is chosen, and 1 is incrementally added to increase the magnitude of l after each 0.4 sec interval. Thus, l indicates the lapse of a time interval of 0.4 sec while K is incremented by one for each time length of 0.05 second during a particular value of l, with K=9 returning to K=1. Thus, K indicates the elapse of a subdivision time. The character "i" indicates a load on the vehicle, and upon starting the vehicle (l=0), the load on the vehicle is determined on the basis of a rate of change of the rotational speed of the engine, dNe/dt, when the clutch has just been engaged and the value of i is determined in accordance with the magnitude of the load. However, during l=1 and subsequent segments, the value of i is determined in accordance with the actual slip rate e=No/Ne. The character "j" indicates an engine power, which is determined on the basis of the throttle opening Tθ. Thus, from the starting of the vehicle until the clutch is completely engaged, a combination of the 0.4 sec segment l, the load on the vehicle i and the engine power j determines a particular group of clutch energization controlling data, each including eight data which define the rate of level change (the rate of engagement of the clutch e/dt; t is represented in terms of K units or 0.05 sec) for the particular group. In each segment shown in FIG. 4, where a curve is branched, the branch is determined by i and j. In FIG. 4, a hatched region represents an extent where a clutch slip rate e does not exist actually upon starting the vehicle. No clutch controlling data is necessary in such region, and hence no corresponding data is stored in ROM 92 and 93. To prevent such region from being inadvertently accessed, a data access program, to be described later, prevents an address within the hatched area in FIG. 4 from being specified. Accordingly, clutch controlling data stored in the ROM 92, 93 is determined by an address having l=0 to 8, i=1 to 9, j=1 to 4 and K=1 to 8 as parameters. Though the number of the parameters is increased, the number of data is not so much.

Considering the clutch controlling data shown in FIG. 4, they include data which are utilized for the purpose of control when starting upon a flat road, upon starting on an up slope, when starting upon a very steep slope, when starting on a down slope, and when applying an engine brake.

Figure 5A:
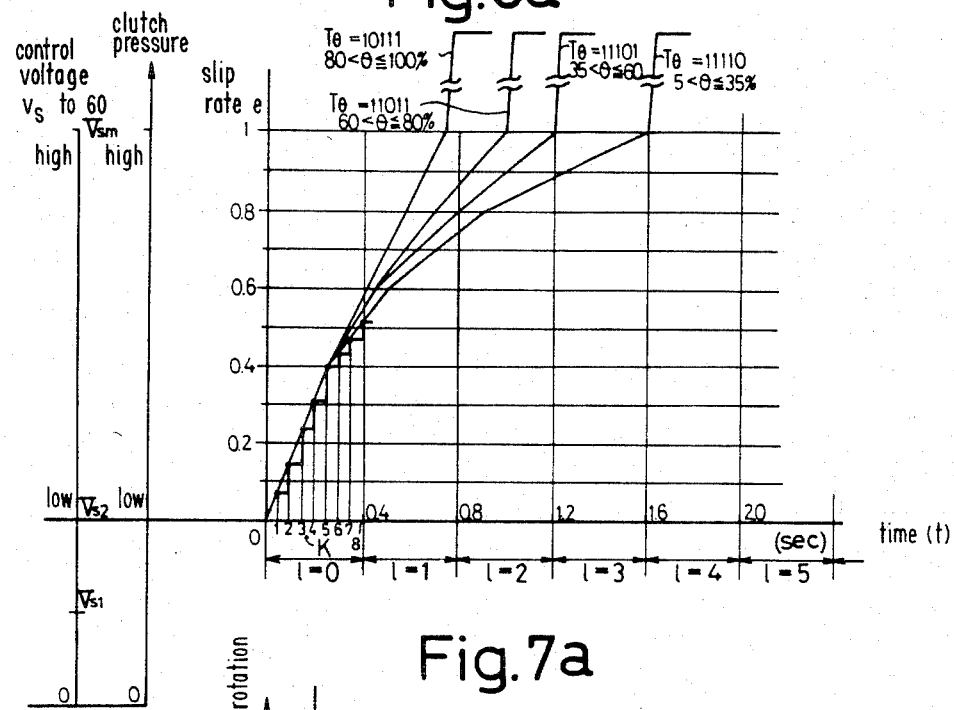
Figure 5B:
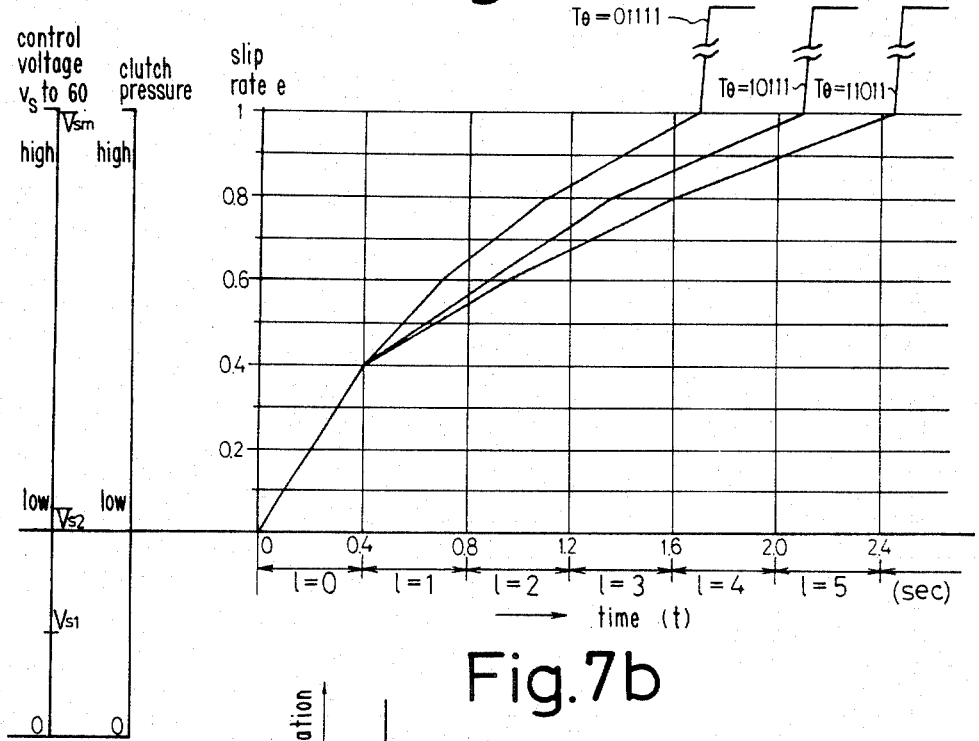
Figure 5D:
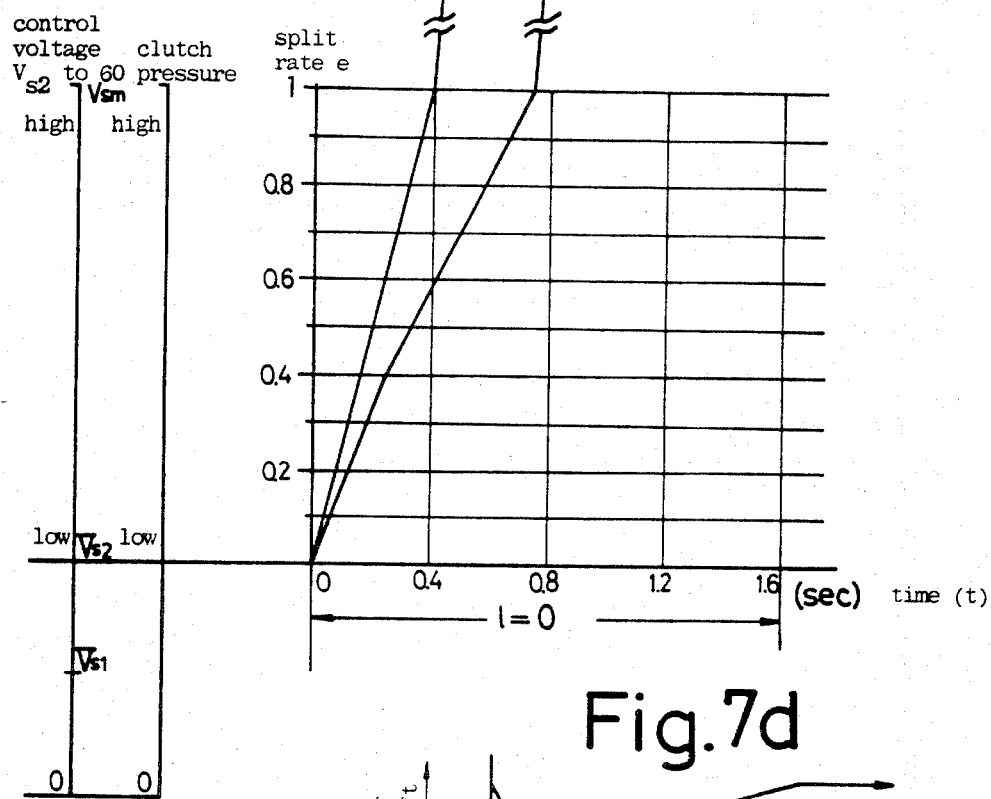

FIG. 5a illustrates several data which may be used when starting on a flat road. As indicated in FIG. 5a, the clutch energization controlling data Vs (a voltage controlling the pressure regulating valve 60) has a reduced magnitude of change rate (dVs/dt) whenever the throttle opening Tθ or j is small, but has a greater change rate if the throttle opening Tθ has a greater value. FIG. 5b illustrates several data which may be used upon starting on an up slope. When running on an up slope, the load imposed upon the vehicle is high, so that the change rate dVs/dt is established at a lower value. FIG. 5c illustrates data utilized when starting on a very steep up slope. In this instance, the load applied to the vehicle is further increased, so that a greatest length of time is established for the slip rate e to change from 0 to 1. Accordingly, the change rate dVs/dt assumes the smallest value. FIG. 5d illustrates data used when starting on a down slope and when applying an engine brake. When starting on a down slope or applying an engine brake, the vehicle drives the engine and hence a greater value is used for the change rate dVs/dt.

ROM 92, 93 store a clutch control program which is used to control the clutch, in addition to the clutch energization controlling data mentioned above.

FIGS. 6a to 6i are flowcharts illustrating clutch control operations performed by the CPU 91 in accordance with the program stored. Referring to these Figures, the operation of the microprocessor unit 90 will be described in detail below.

(1) Decision of load on the vehicle upon initiating a clutch control, and the clutch control during the first segment l=0:

When the power is turned on, CPU 91 effects an initialization of its input/output ports $I_0$ to $I_{26}$ and $O_0$ to $O_{12}$, and produces a low level or "0" on the output port $O_0$ connected to the switch valve 50, indicating the closure of the valve. A clutch controlling data Vs1 is produced on the output ports $O_2$ to $O_{12}$ connected to the pressure regulating valve 60 which would establish a very low oil pressure insufficient to cause an engagement of the clutch or which maintains the slip rate e of the clutch substantially zero. The shift lever position (Sp code) is then read, and if it indicates the neutral position N, the unit remains in its standby mode. If the shift lever position is either drive D or reverse R position, the CPU applies a high level or "1" to the output port $O_0$, causing the valve 50 to be opened. In response thereto, an oil pressure which substantially corresponds to e=0 is applied to the clutch 30. The CPU 91 then reads the rotational speed of the engine (Ne code), and if the engine speed Ne is less than 900 rpm indicating an idling condition and the absence of an energization for starting or the depression of an accelerator pedal, it waits for the energization for starting or an engine speed equal to or greater than 900 rpm, or the depression of the accelerator pedal. When an engine speed equal to or greater than 900 rpm is reached, the rotational speed of the driven shaft of the clutch (No code) is read to calculate the actual slip rate e. At this stage, e≈0 unless the vehicle is running on a down slope, and e≧0 if the vehicle is running on a down slope. The above operation is illustrated by the flowchart shown in FIG. 6a. When the vehicle is substantially at rest (e≦0.1→YES), the CPU jumps to the flowchart shown in FIGS. 6b to 6d where the load on the vehicle is detected. In this flowchart, the CPU 91 initially reads the throttle opening (Tθ code), and if the throttle opening Tθ is less than 60%, indicating a setting for the engine power which is relatively low, it refers to the engine speed Ne to determine if it is equal to or greater than 1200 rpm which enables a starting operation. If the engine speed is less than 1200 rpm, the starting operation is disabled, and hence it waits for the throttle opening to reach or exceed 60% or for the engine speed to reach or exceed 1200 rpm. In response to $T\theta \geq 60\%$ or $Ne \geq 1200$ rpm, the CPU 91 reads the rotational speed of the driven shaft of the clutch (No code) and if it indicates zero, produces a given controlling data Vs2 on the output ports $O_2$ to $O_{12}$ connected to the pressure regulator valve 60 which establishes a slip rate e slightly greater than zero. It then reads the rotational speed of the engine Ne at an interval of 0.05 sec, and makes a decision to see if $Ne-Ne1 \leq 0$, by comparing the current value of Ne with a value Ne1 which has been read 0.05 sec earlier. In other words, it waits for a reduction in the engine speed Ne in response to the application of the signal Vs2. If a reduction in the engine speed Ne occurs, it determines that a slight engagement of the clutch has occurred or the engagement of the clutch has been initiated. The CPU then stores the prevailing Ne code in a register Ne1 or updates the engine speed, and clears a number of times register l. After 0.1 second, it reads the Ne code again in order to calculate the change rate of the engine speed $dNe/dt = Ne1 - Ne$. The rate dNe/dt has an increased value when the load on the vehicle is high (or when the weight of the vehicle is high and when running on a up slope), and has a low value when the load is low. Count 1 is entered into a register K which specifies a particular subinterval address to provide a clutch control during the first segment l=0 (where l represents the content of a register l), thus specifying the first data of this segment. Also, a load representing code i (which represents the content of a register i) is loaded into the register i in accordance with the load on the vehicle dNe/dt previously calculated. The described operation is illustrated by the flowcharts shown in FIGS. 6b and 6c.

Figure 7A:
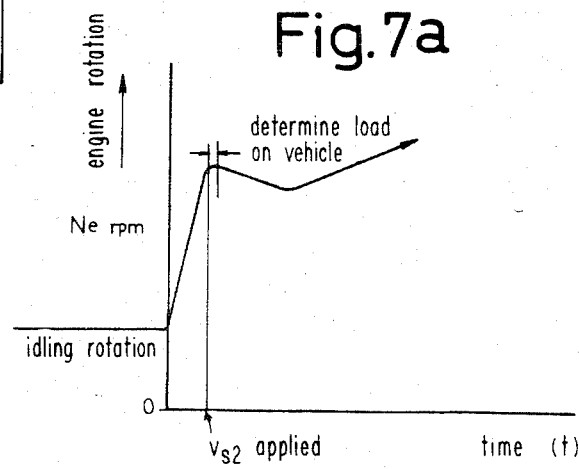
Figure 7B:
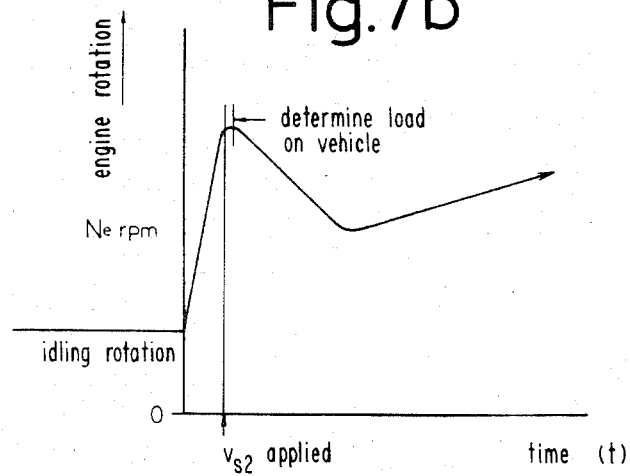
Figure 7D:
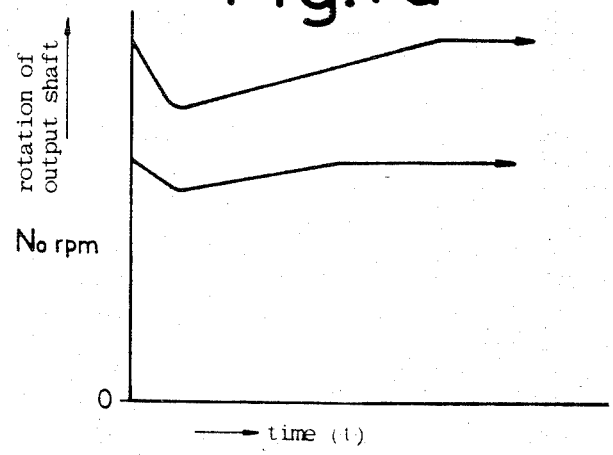
FIG. 7d graphically shows a change in the rotational speed No of the driven shaft of the clutch during an engine brake control.

The relationship between the timing of determining the load and the behaviour of the engine speed Ne is illustrated in FIGS. 7a, 7b and 7c. FIG. 7a illustrates the relationship when starting on a flat road, FIG. 7b when starting on an up slope and FIG. 7c when starting on a very steep up slope. FIG. 7d graphically shows a change in the speed of the driven shaft of the clutch during an engine brake mode, to be described later, when the vehicle is running.

Figure 6A:
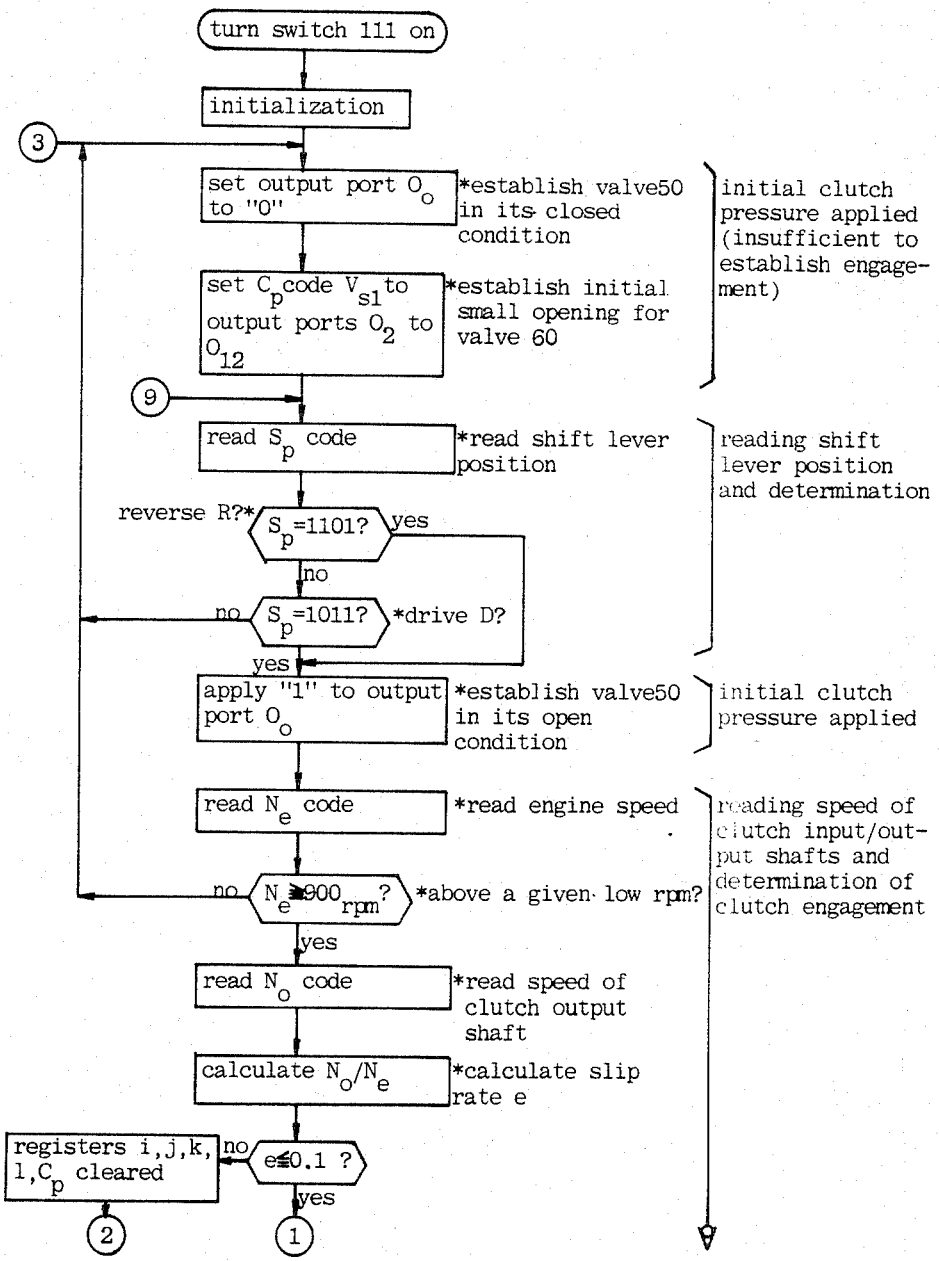
FIGS. 6a, 6b, 6c, 6d, 6e, 6f, 6g, 6h and 6i are flowcharts illustrating a clutch control operation by a central processing unit shown in FIG. 2 based upon program data stored in the read only memories also shown in FIG. 2.
Figure 6B:
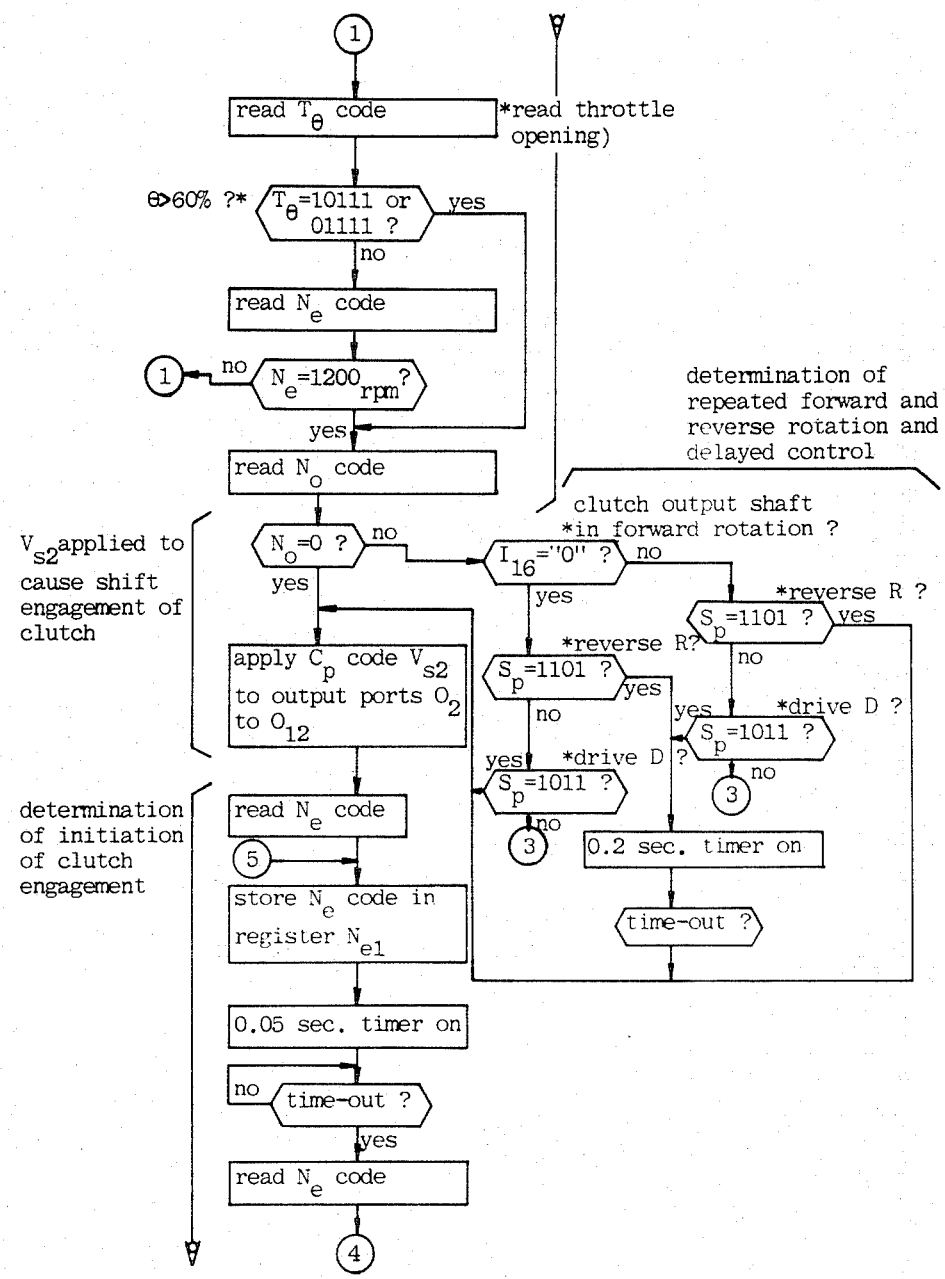
Figure 6C:
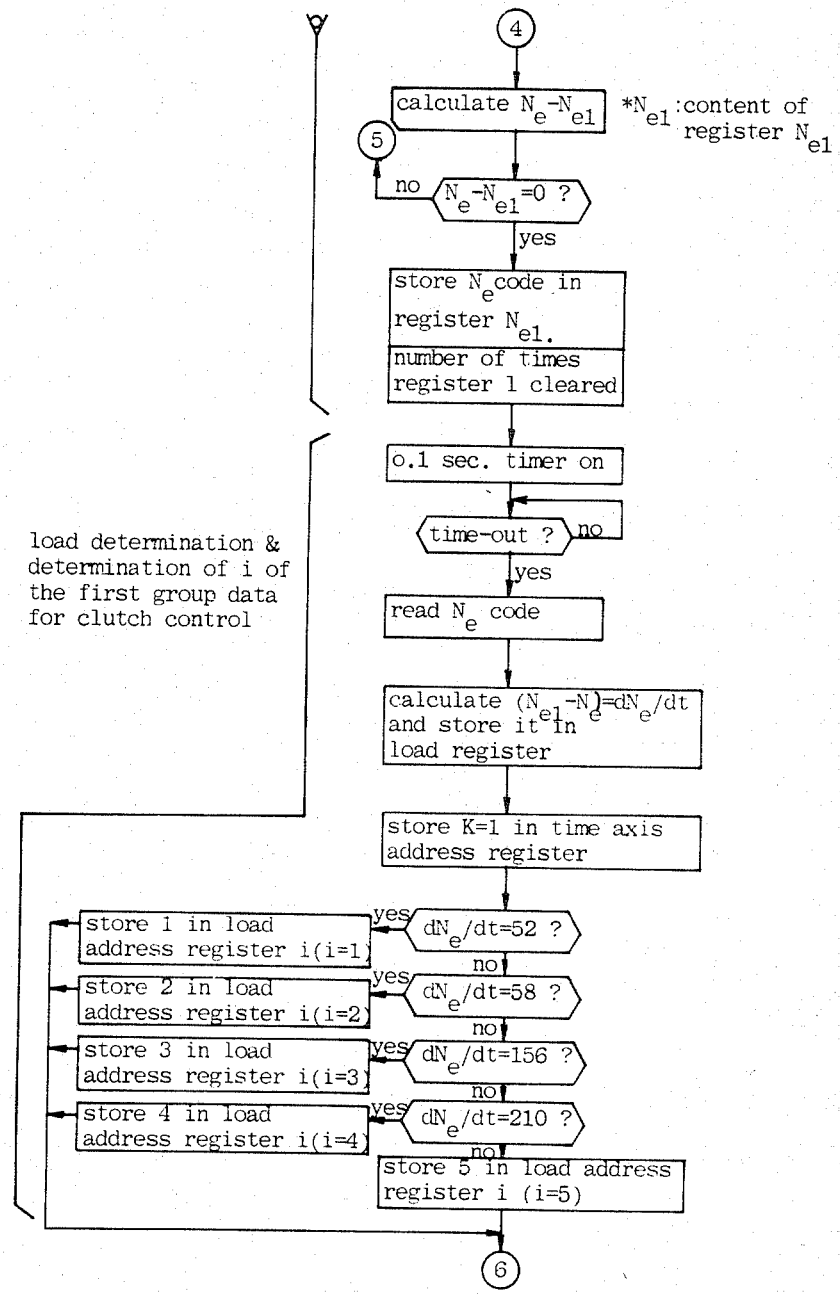
Figure 6D:
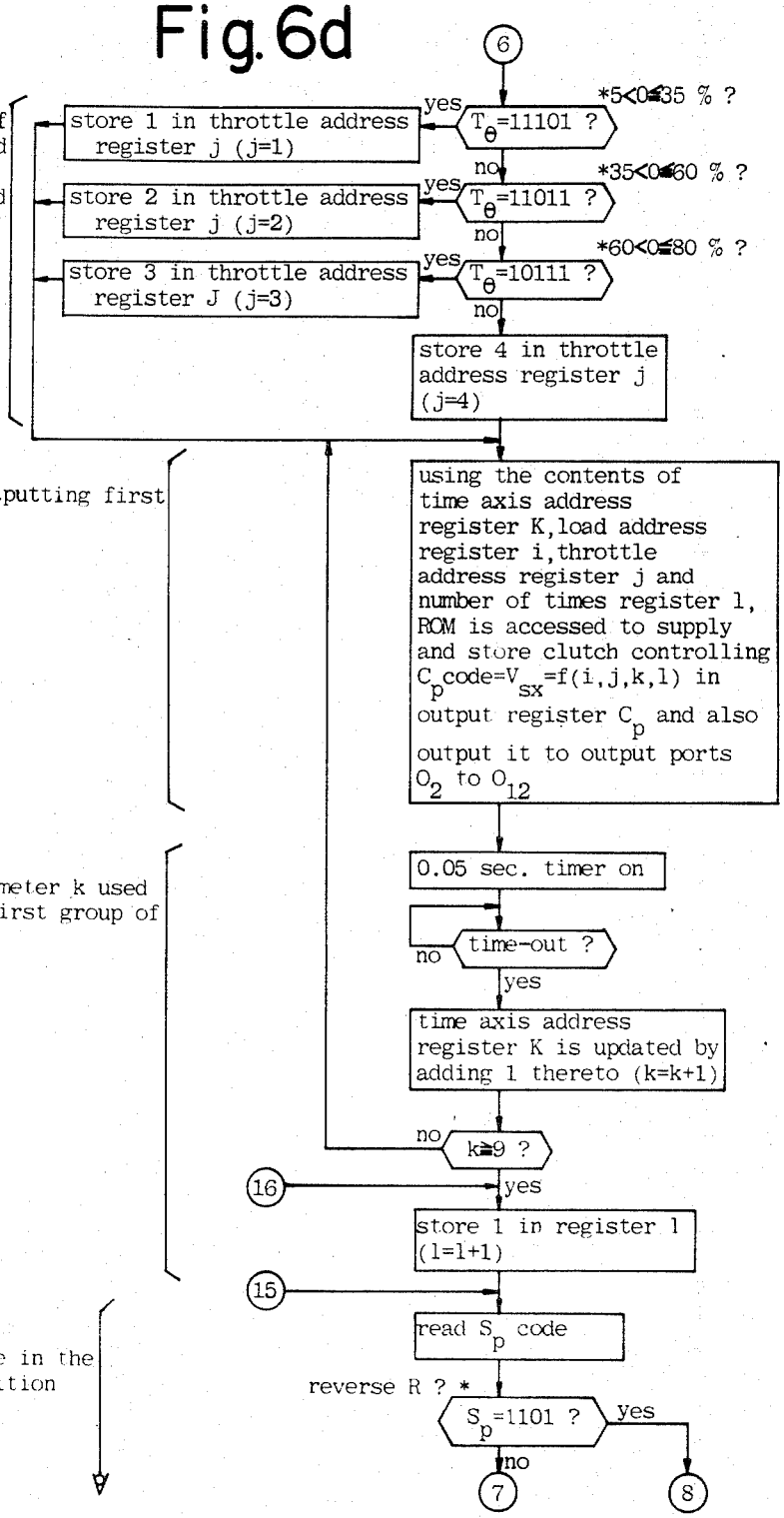
Figure 6E:
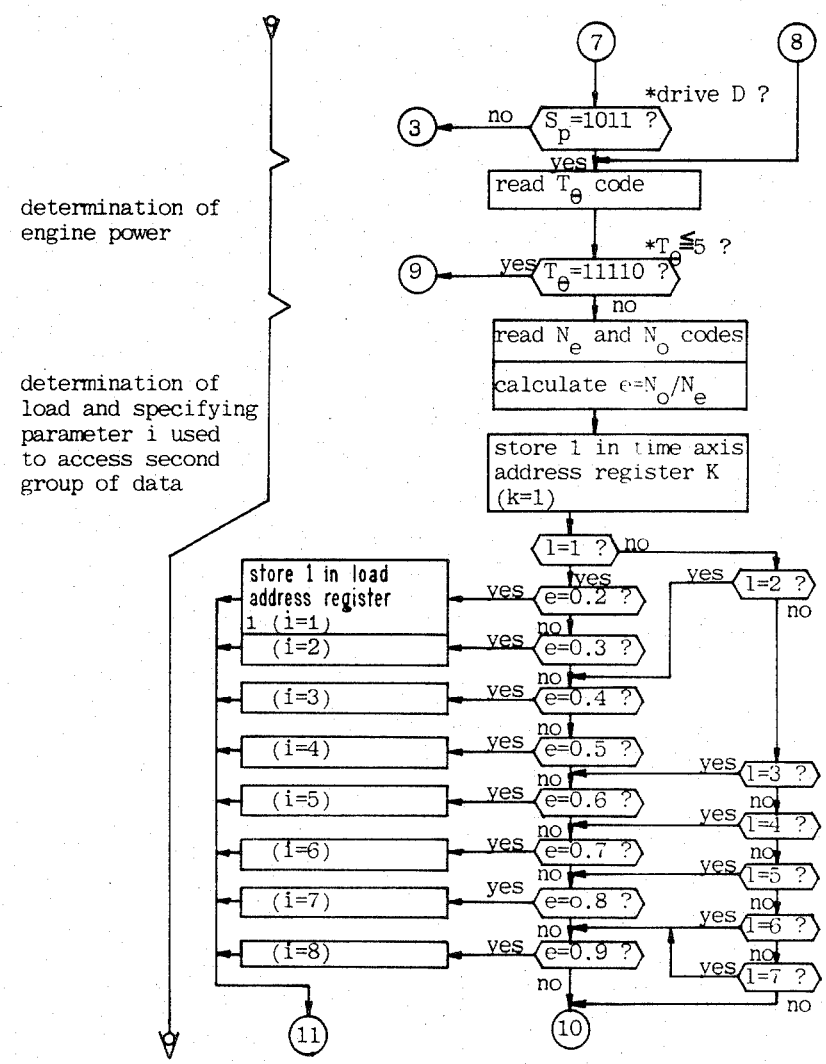
Figure 6F:
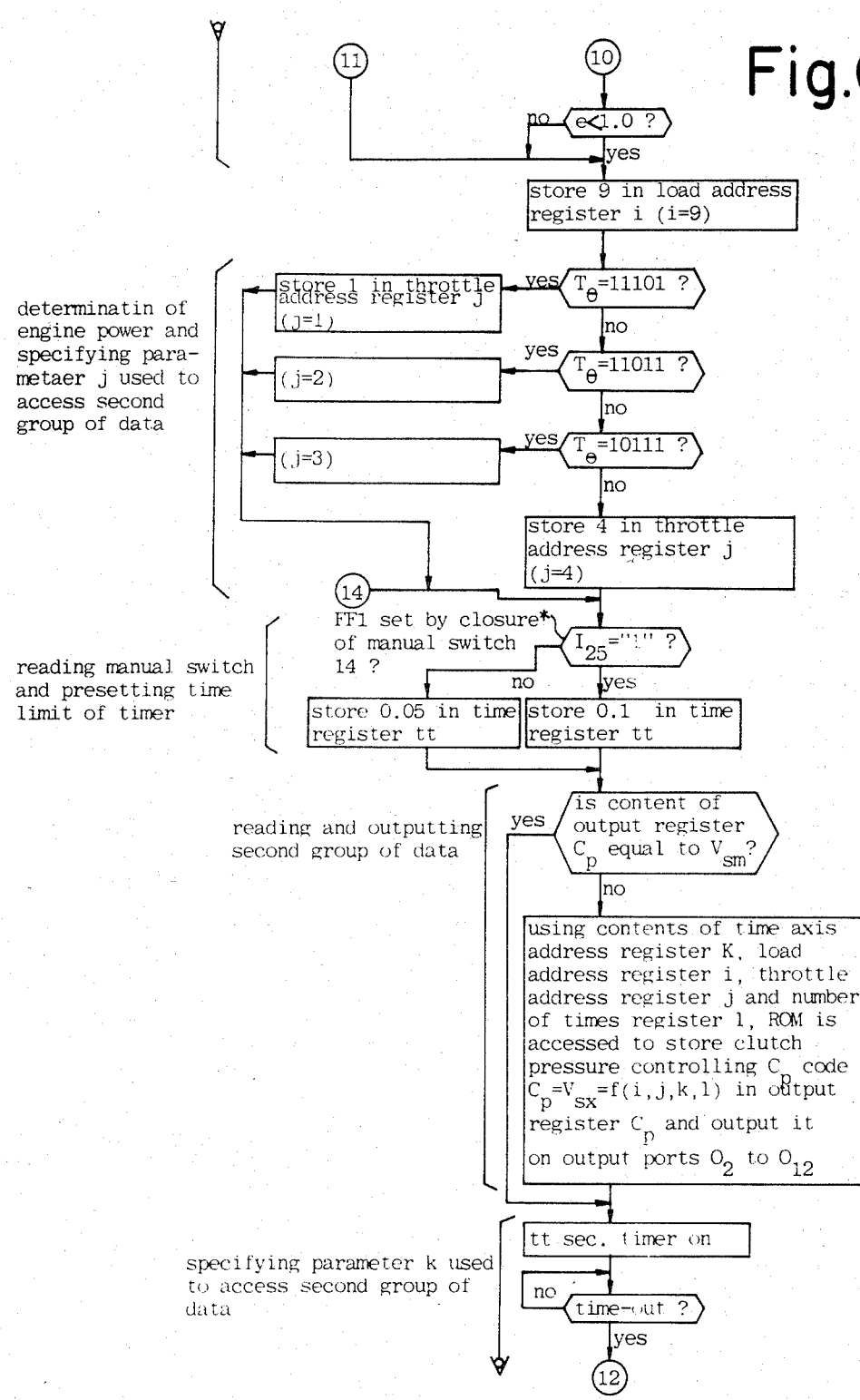
Figure 6G:
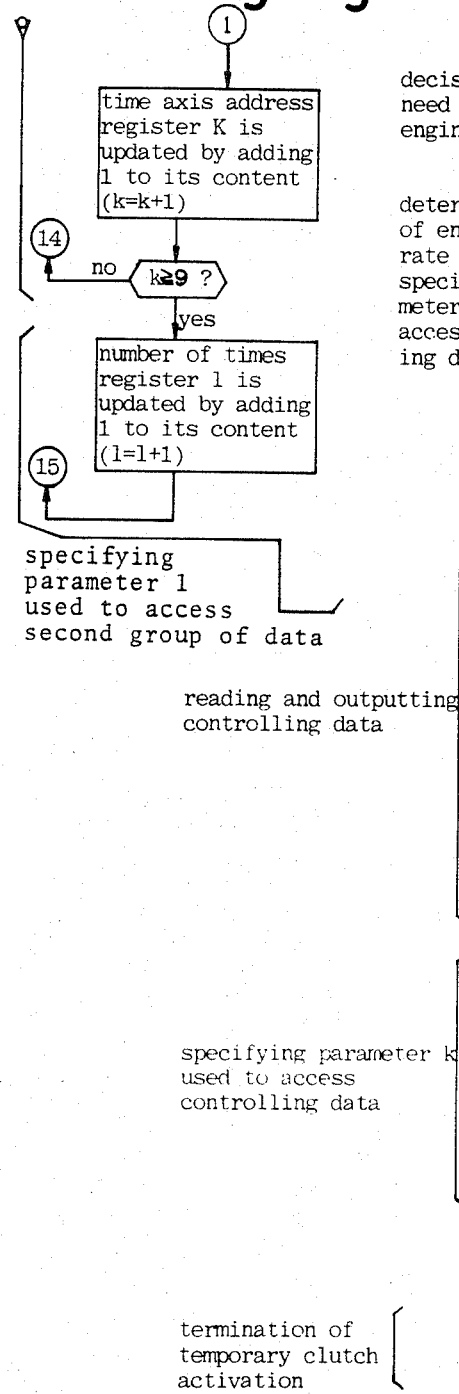
Figure 6H:
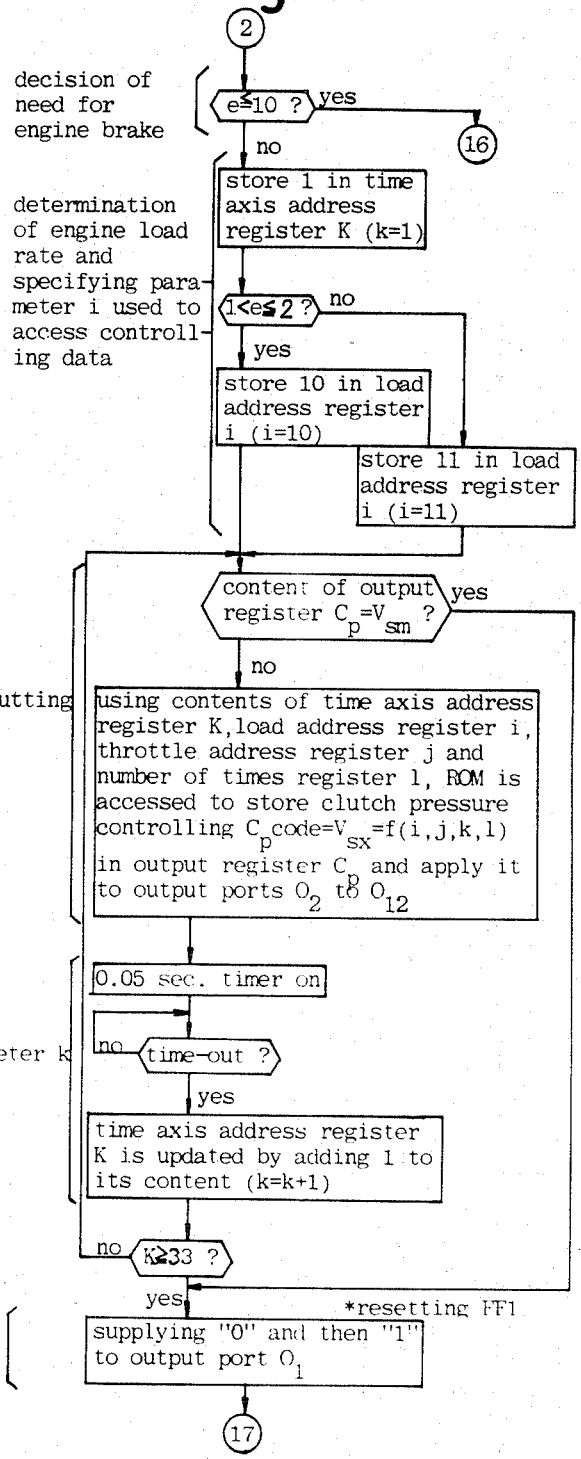
Figure 6I:
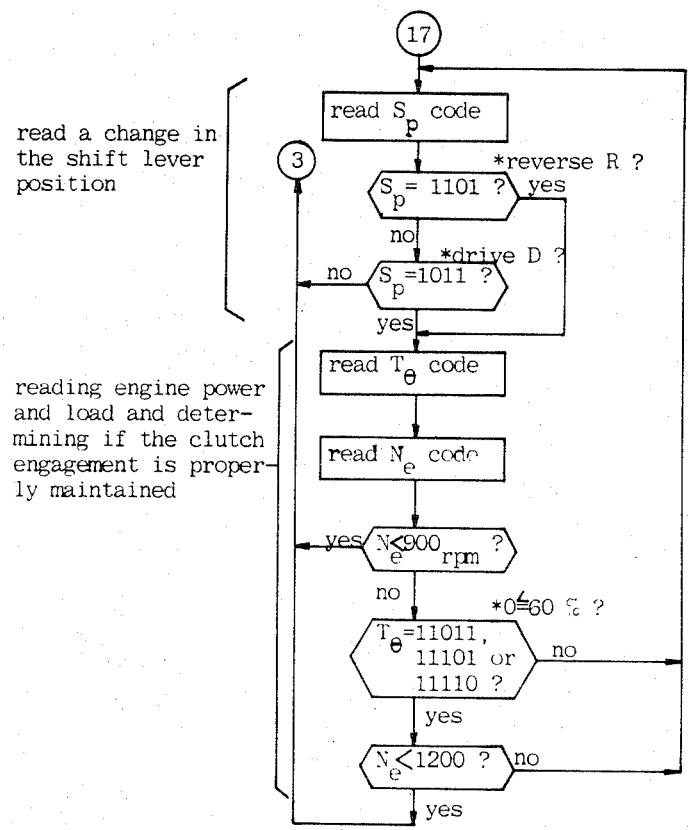

Referring to the flowchart shown in FIG. 6d, the CPU 91 reads $T\theta$ code, and stores an engine power representing code j (which represents the content of a register j) into the register j in accordance with the $T\theta$ code or the engine power. At this point in time, it will be seen that a code specifying the first segment l=0 is stored in the register l, a code specifying the first data K=1 is stored in the register K, a code representing the vehicle load i is stored in the register i, and a code representing the engine power j is stored in the register j, respectively. This point in time corresponds to the origin of the curves shown in FIGS. 4, 5a, 5b, 5c and 5d. The CPU 91 then reads out data from the registers i, j, K and l to make up an address to read out a first clutch controlling data (K=1) of a particular group specified by the values of i and j from either ROM 92 or 93, it being recalled that a single group includes eight clutch energization controlling data. The data read out is stored in an output register Cp, and is also outputted on the output ports $O_2$ to $O_{12}$. As a result, a clutch control voltage Vs3 (l=0, K=1) which follows the voltage Vs2 is applied to the D/A converter 81 and thence to the solenoid driver 82. Consequently, the energization level of the solenoid associated with the pressure regulating valve 60 is increased so as to correspond to the magnitude of Vs3, and the opening of the valve 60 also increases, thus increasing the pressure with which the clutch 30 is engaged and also increasing the slip rate e. When a time interval of 0.05 sec passes subsequently, the CPU 91 then increments the content of the register K by one to access either ROM 92 or 93 in terms of the parameters i, j, K and l, thus reading out a next following clutch controlling data Vsx. The data read out is stored in the register Cp and is also outputted on the output ports $O_2$ to $O_{12}$. When the content of the register K reaches 9, the content of the register l is changed to l=1. This completes the clutch control for the first segment l=0. In the described control for the first segment l=0, it should be noted that the values of i, j and l are not updated when making a successive read-out (K=1 to 8) of data from ROM. It is also to be noted that the detection of the vehicle load takes place together with the detection of a downward reversal of the engine speed as well as the calculation of dNe/dt.

(2) A selection of clutch control mode and resetting after the initiation of clutch control:

When the number of times register l is set to 1, the CPU 91 reads the shift lever position (Sp code), and if it has changed to the neutral N position, it returns to waiting for the starting illustrated in FIG. 6a, inclusive of a waiting for a change from the neutral N position to the drive D or reverse R position during the running. If the shift lever position remains to be the drive D or reverse R position, the CPU 91 reads the throttle opening $T\theta$ and if it indicates an opening (corresponding to a value less than 6% and the release of the accelerator pedal) which indicates an idling condition, it determines that a starting stop, inclusive of a vehicle stop and an engine braking, is instructed, thus returning to reading the shift lever position as indicated in FIG. 6a. If the throttle opening $T\theta$ is equal to or greater than 6%, indicating a forward advance, the CPU 91 then resets the register K to K=1, and calculates the slip rate e by reading the Ne code and No code. The slip rate e which prevails corresponds to the load on the vehicle, and hence the value of i is determined in accordance with the value of e and stored in the register i. In the second segment l=1, a preset value of the slip rate is above 0.2 as shown in FIG. 4, and thus any slip rate exceeding 0.2 is subject to the decision. However, during the segments which are equal to or greater than l=2, the value of the slip rate e which is to be determined is limited to its higher side as shown in FIG. 4, the lower limit of the slip rate which is to be determined being sequantially shifted toward the higher side (refer to the flowchart in the lower half of FIG. 6e and FIG. 6f). Considering the flowchart for the second segment l=1, CPU 91 then reads the throttle opening ($T\theta$ code), and determines the value of i in accordance with the throttle opening to be stored in the register i. It then proceeds through the decision "$I_{25}$ = "1"?" to see if the temporary clutch activation prevails for reason of the congested road condition, to be described later, and if the temporary clutch activation is defective, it establishes a longer value 0.1 sec for the sampling time tt during which the value of K is to be updated, and it establishes a standard value of 0.05 sec if the temporary clutch activation is not effective. Then it reads ROM 92 or 93 at an address defined by the content of the registers i, j, K and l to derive a clutch controlling code Vsx, which is then stored in the output register Cp and is also outputted on the output ports $O_2$ to $O_{12}$. After the time limit of tt, the value of K is changed from K=1 to K=2. It then similarly reads data from ROM, and increments the value of K for each time limit of tt. When K=9 is reached, the content of the register l is incremented by one, thus returning to reading the shift lever position as shown in FIG. 6d. The described operation is illustrated by the flowchart extending from the lower portion of FIG. 6d to FIG. 6g. As mentioned previously, each group of clutch energization controlling data includes eight clutch control data in principle, each of which is defined by K=1 to 8. However, after reading clutch control data Vsm corresponding to e=1 and applying it on the output ports, the clutch 30 is reset to the slip rate e=1. Hence, a clutch on control from its non-engaged condition to its perfect engagement has been completed. Accordingly, before the step of reading data from ROM illustrated in FIG. 6f, the content of the output register Cp is compared against the code Vsm which establishes e=1, and if it is found that the content of the output register Cp is equal to Vsm, data reading from ROM is skipped. This means that when Vsm appears in a particular group of data at a point where K=1, i<8, data for K=i+1 and greater are omitted. Accordingly, after the output supplied to the pressure regulating valve 60 reaches Vsm, this output is maintained. When the throttle opening subsequently changes to an idling opening (engine brake), the arrangement returns to the detection of the shift lever position illustrated in FIG. 6a from the third step illustrated in FIG. 6e. When the shift lever position changes to the neutral N position, the flowchart returns from the first step of FIG. 6e to the clutch non-engaged step of FIG. 6a. As long as the shift lever position remains in its drive D or reverse R position with $T\theta \geqq 6\%$, the clutch controlling code Vsm indicating e=1 continues to be applied to the output ports $O_2$ to $O_{12}$.

To summarize, the shift lever position Sp, the load on the vehicle i and the engine power j are read at an interval of 0.4 sec (when tt=0.05 sec or at an interval of 0.8 sec for tt=0.1 sec), and in response to each reading, a clutch control is performed in accordance with the established value or condition. The data group is selected in terms of i, j and the elapsed time l at an interval of 0.4 sec until e=1 (Vsm) is reached, and within the interval of 0.4 sec, clutch controlling data Vsx within the particular group is changed at a short time interval or subinterval of 0.05 sec. Accordingly, the control of the clutch engagement starts with e=0, and is completed with e=1. During this process, any change in the vehicle load i or the engine power j causes the rate of change in the engagement of the clutch (de/dt or dVs/dt) to be changed accordingly, thus assuring a proper clutch control in accordance with both the road condition and the operation of the accelerator pedal by the driver.

Figure 8B:
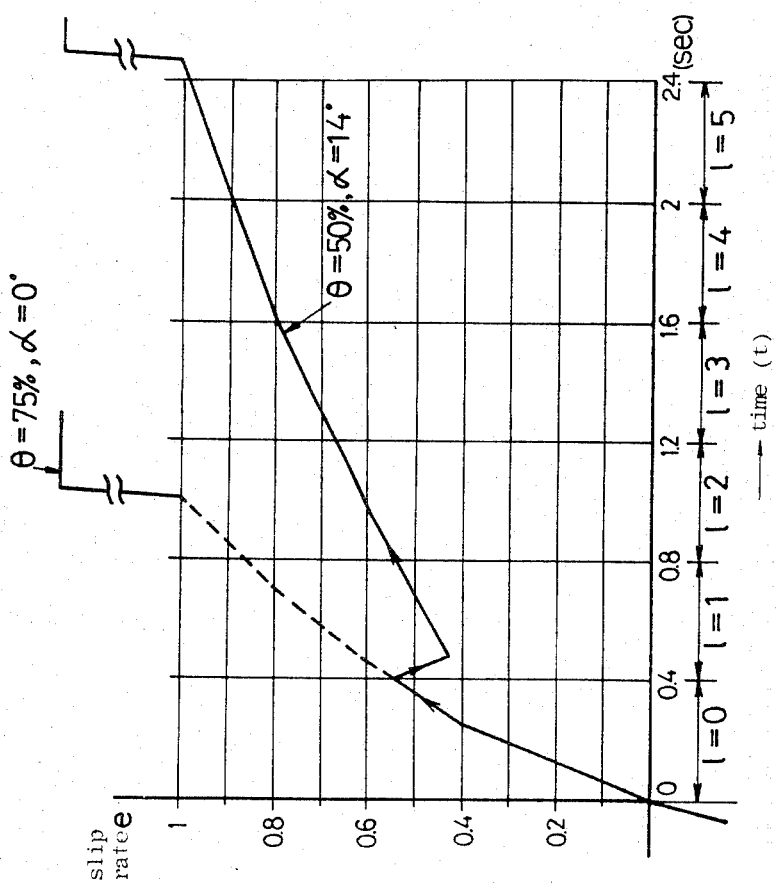
FIGS. 8a and 8b graphically show a clutch turn-on characteristic in response to a change in the vehicle loading and the throttle opening during a temporary clutch activation.
Figure 8A:
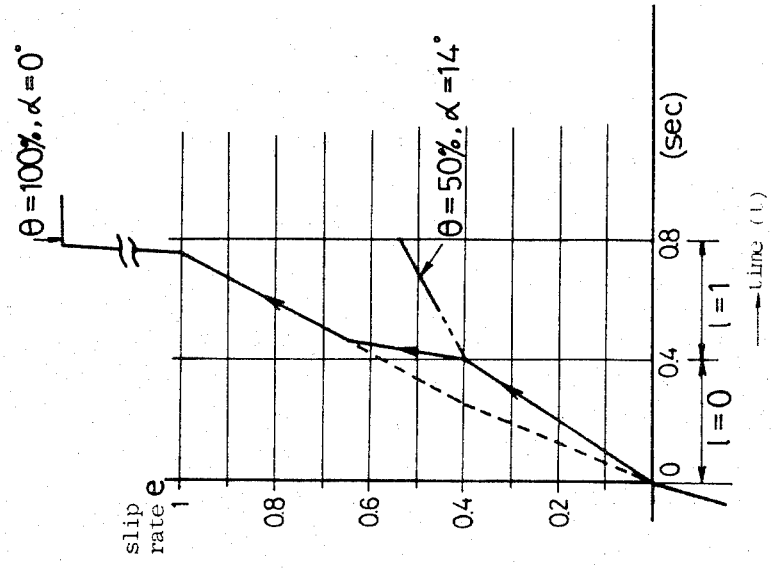
Figure 8D:
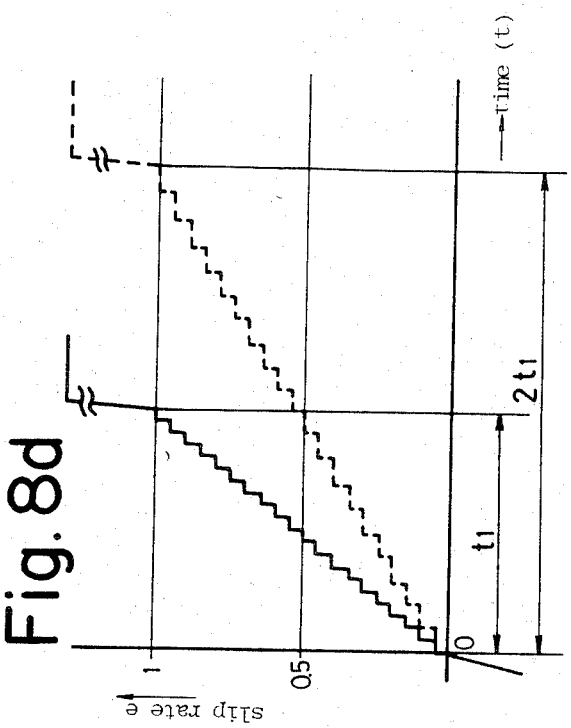
FIG. 8d graphically shows the clutch turn-on response during a manual temporary clutch activation.

Considering this in more detail, assuming a throttle opening of 50% and that the vehicle is running on an up slope having an inclination $\alpha = 14°$ at the origin or the start of the clutch control as indicated in FIG. 8a, the throttle opening is increased to 100% until the end of l=1. When $\alpha = 0°$, a particular group of data is specified by the opening of 100% and the prevailing slip rate e corresponding to $\alpha = 0°$ during the next segment l=1, thus establishing an increased value for dVs/dt to accelerate the clutch engagement (e=1). When the reverse is true, a smaller value is established for dVs/dt to retard the clutch engagement (e=1) with a reduction in the throttle opening and an increase in the vehicle load, as indicated in FIG. 8b.

Figure 8C:
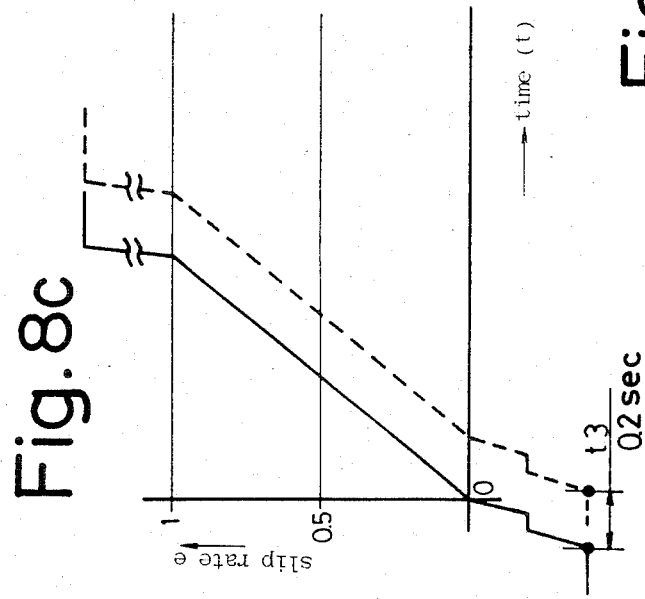
FIG. 8c graphically shows regions where the engine brake can be applied and cannot be applied.
Figure 8E:
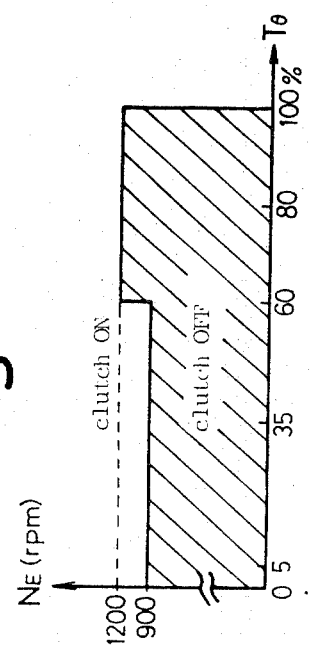
FIG. 8e graphically shows the clutch on-off region in relation to the throttle opening and the rotational speed of the engine.

(3) Clutch control when starting on a down slope and when applying an engine brake:

When starting on a down slope, if the slope has a small inclination, the operation is similar to that described above in connection with a normal starting. Because the vehicle load dNe/dt is small, a data group having an increased value of dVs/dt is specified during the segment l=0. Similarly, during the segments l=1, 2, ..., an increased value of e caused data groups having an increased value of dVs/dt to be specified, thus allowing an early achievement of e=1 by the clutch control. When the slope is steep, upon starting, the vehicle begins running without any application of the engine power thereto. Thus, the decision "e≦0.1?" at the lower end of FIG. 6a is exited through NO, whereby the clutch control transfers to the engine brake control flowchart shown in FIG. 6h. During the engine brake control, CPU 91 determines an actual slip rate e which is less than 1 to be a starting on a slope (since e>0.1), skipping over the segment l=0 and transferring to the clutch control shown in the later part of FIG. 6d and to the segment l=1 and subsequent segments in FIG. 6e. In other words, when the slip rate of the clutch (No/Ne) increases above a given value, the control segment l=0 is skipped. When the engine brake is applied, $T\theta \leqq 5\%$, and hence the flowchart transfers from the third step of FIG. 6e to the step ③ of FIG. 6a, where the clutch is turned off. CPU 91 calculates the actual slip rate, and if it finds that e>1, allowing the application of the engine brake, CPU 91 stores "10" in the register i for $1 \leqq e \leqq 2$, determining that the vehicle load is negative and has a small absolute value, and stores "11" in the register i for 2<e, determining that the absolute value is high. Subsequently, the CPU 91 reads the content of the registers i, j, K and l to define an address, which is used to read clutch controlling data Vsx from either ROM 92 or 93. This data is stored in the output register Cp and is also applied to the output ports $O_2$ to $O_{12}$. Before entering the flowchart shown in FIG. 6h, the registers i, j, K, l and Cp are cleared as a result of the final step $e \leqq 0.1? = NO$ in the flowchart of FIG. 6a, so that i=10 or 11, K=1 and l=0 at this time. When having read data corresponding to K=1, CPU increments K by one for each subinterval of 0.05 sec to read data out of ROM, which data is used to update the content of the register Cp and to update the data applied to the output ports $O_2$ to $O_{12}$. The value of K is monitored, and when K=33, or when 0.05×33=1.65 sec has passed since the initiation of engagement of the clutch, the clutch control is complete in any engine brake control mode (since Vsm is applied to the output ports $O_2$ to $O_{12}$), and thus the CPU returns to reading the shift lever position Sp. If the shift lever position is neutral N, the flowchart transfers to the step ③ of FIG. 6a. If there is no change in the shift lever position, both the throttle opening $T\theta$ and the rotational speed of the engine Ne are read, and Vsm (e=1) is not changed so long as $T\theta \leqq 60\%$ and $Ne \leqq 900$ rpm or $T\theta > 60\%$ and $Ne \geqq 1200$ rpm. If $T\theta \leqq 60\%$ and Ne<900 rpm or if $T\theta > 60\%$ and Ne<1200 rpm, there is a likelihood that an engine stop may occur, thus requiring a transfer to the disengagement of the clutch under the step ③ of FIG. 6a. Thus, when the engine brake is applied, a region (OFF) as indicated in FIG. 8e is designated to disengage the clutch.

(4) Clutch control when repeating a forward and a reverse mode:

When getting the vehicle out of a mire, when riding past an obstacle on the road or turning a narrow T shaped curve, the clutch is repeatedly switched between the forward and the reverse mode (drive D and reverse R) within a short interval, giving rise to the occurrence that the shift lever position may assume the drive D position when the output shaft of the clutch is rotating in the reverse direction or the shift lever position may assume the reverse R position when the output shaft is rotating in the forward direction. At this time, the CPU 91 determines if the direction of rotation of the driven shaft of the clutch and the preset shift lever position is similar or dissimilar in accordance with the direction of rotation signal, the output from the decision circuit 78 applied to the input port $I_{16}$ and indicative of the direction of rotation of the driven shaft of the clutch, and the shift lever position Sp, contingent upon the requirement that the step "No=0?" of FIG. 6b exits through NO or the driven shaft is in rotation. When switching between the forward and the reverse mode within a short interval, or when the direction of rotation of the driven shaft of the clutch is opposite from the preset shift lever position, the clutch ON control is initiated after waiting for a reduction in the rotation of the driven shaft for 0.2 sec. Consequently, where the slip rate (Vsx) of the clutch 30 is normally to be controlled as indicated by a solid line in FIG. 8c, the engagement of the clutch is delayed by 0.2 sec as indicated by dotted lines if the driven shaft of the clutch is rotating in the opposite direction from that established by the shift lever position. This prevents an overloading of the engine and an engine stop.

(5) Manual temporary clutch activation:

When the flipflop FF1 is set in response to the closure of the manual switch 14, the input port $I_{25}$ assumes a high level or "1". During the clutch control in the segment l=1 and subsequent segments (continuing from the bottom of FIG. 6d to FIG. 6g), the CPU 91, after presetting i and j, reads the input port $I_{25}$ ("$I_{25}$="1" ? of FIG. 6f), and if $I_{25}$ is equal to "1", it establishes a data updating timing tt to be 0.1 sec. As a result, whenever $I_{25}$ is equal to "1", the value of K is incremented for each interval of 0.1 sec. In other words, a single segment (l=1, l=2, . . . ) encompasses 0.8 sec. When $I_{25}$ is equal to "0", the value of tt is chosen to be 0.05 sec, and hence the value of K is incremented for each subinterval of 0.05 sec so that a single segment corresponds to 0.4 sec. Consequently, whenever $I_{25}$ is equal to "0", the slip rate of 1 (Vsm) is achieved within a time interval of $t_1$ while whenever $I_{25}$ is equal to "1", the slip rate of 1 (Vsm) is achieved within a time interval of $2t_1$, doubling the temporary clutch activated time. Hence, when the traffic on the road is congested to result in a reduced spacing between adjacent vehicles, the driver may start after temporarily closing the manual switch 14. The flipflop FF1 which produces $I_{25}$="1" is reset in the flowchart of the engine brake control shown in FIG. 6h after once achieving e=1 (Vsm) for the clutch in the engine brake mode. This resetting operation takes place by CPU 91 applying "0" output on the output port $O_1$. Accordingly, the clutch ON control having an increased length of temporary clutch activation takes place after momentary closure of the manual switch 14 until the engine brake is applied or until the vehicle has get out of the congested traffic condition and is accelerated and subsequently decelerated by the engine brake.

The above operations (1) to (5) can be summarized as follows:

(a) The clutch ON control is initiated when establishing the drive D or reverse R shift lever position and reaching the rotational speed of the engine Ne≧900 rpm.

(b) At the initiation of the clutch ON control, the actual slip rate e which is derived when establishing the slip rate e=0 for the clutch enables a discrimination between a condition in which the engine power is required to drive the vehicle and another condition in which the engine power is required to brake the vehicle.

(c) Under the condition that the engine power is required to drive the vehicle, there is an instance in which the first segment l=0 is skipped over and the clutch ON control may begin from the second segment l=1 when the actual slip rate e is greater than 0.1, and another instance in which the clutch ON control is to be started from the first segment l=0 whenever the actual slip rate e is equal to or less than 0.1. In the former instance, the clutch ON control in the second segment l=1 which is described under the paragraph (e) below is immediately entered.

(d) When the clutch ON control is to start from the segment l=0, a reduced value of the actual slip rate e requires that an oil pressure which achieves a low level of engagement of the clutch (Vs2) be applied to the clutch in order to allow the load to be detected, followed by the detection of a reduction in the number of revolutions of the engine Ne. After detecting a reduction in Ne, dNe/dt is detected in order to determine the load on the vehicle such as the weight, the inclination of the load or the like. The throttle opening Tθ is used to determine the engine power. The combination of the vehicle load and the engine power specifies a particular data group (Vsx=f(t)) having a proper clutch on change rate (dVs/dt) in the first segment l=0. The clutch controlling signal Vsx is changed at a time subinterval of ΔT=0.05 sec. In the segment l=0, $$\sum_{K=1}^{8} \Delta t = 0.4 \text{ sec.}$$

After proceeding through the segment l=0, the clutch ON control enters the second segment l=1.

(e) During the clutch ON control for the second segment l=1, the actual slip rate e is utilized as indicative of the vehicle load, and the throttle opening is utilized as indicative of the engine power in the same manner as in the first segment. These specify a particular group of clutch controlling data Vsx=f(t) having a proper clutch ON change rate (dVs/dt) for the second segment l=1. The clutch control signal Vsx is changed at a time subinterval of Δt=tt sec. In the second segment l=1, $$\sum_{K=1}^{8} tt = 0.4 \text{ or } 0.8 \text{ sec.}$$

After proceeding through the segment l=1, the clutch ON control in the third segment l=2 is entered. This takes place in the similar manner as during the segment l=1. A similar clutch ON control is repeated for the segments l=3, 4, . . . . However, during any segment beginning with the segment l=0, if the clutch control signal reaches Vsm which specifies that e=1, the clutch controlling data ceases to be updated, and the shift lever position Sp, the actual slip rate e and the throttle opening Tθ are read at a time interval of $$\sum_{K=1}^{8} \Delta t = 0.4 \text{ sec}$$

(or $$\sum_{K=1}^{8} \Delta t = 0.8 \text{ sec}$$

where $I_{25}$="1" specifying a temporary clutch activation). When Sp indicates the neutral N position, the control returns to clutch OFF (specifying e=0) or the paragraph (a) mentioned above, and when Tθ≦5%, the decision of the condition mentioned above under the paragraph (b) is made.

(f) If it is determined under the paragraph (b) that the engine power is required to brake the vehicle, the clutch ON control which enables the application of the engine brake is performed. In this instance, the clutch proceeds from its non-engagement to its complete engagement within a reduced time, and after the complete engagement is achieved (Vs=Vsm), the shift lever position Sp, the throttle opening Tθ and the rotational speed of the engine Ne are continuously monitored. Whenever they indicate a condition during which the engine brake cannot be applied, the control returns to the clutch OFF (specifying e=0) to recycle to the paragraph (a).

(g) If the direction of rotation of the driven shaft of the clutch differs from that specified by the shift lever position Sp under the paragraph (d), an oil pressure which achieves a low level of engagement of the clutch (Vs2) is applied with a given time delay of 0.2 sec.

(h) If during the clutch ON control for the segment l=1 and subsequent segments which was mentioned under the paragraph (d), the flipflop FF1 is set ($I_{25}$="1"), Δt=tt=0.1 sec and the single segment of $$\sum_{K=1}^{8} \Delta t = 0.8 \text{ sec}$$

are chosen, doubling the time required from e=0 (Vs=Vs2) to e=1 (Vs=Vsm) to be doubled as compared with the time required when the FF1 is reset ($I_{25}$+"0"). In other words, the temporary clutch activation period is doubled. The flipflop FF1 is set by a momentary closure of the manual switch 14, and is reset by Vs=Vsm during the application of the engine brake.

As discussed above, in the described embodiment, a particular group of clutch controlling data is specified from the initiation of the clutch ON control by a combination of the number of revolutions of the engine (Ne), the actual slip rate (e), the vehicle load (dNe/dt) and the engine power (Tθ). Subsequently, the particular group of clutch control data is updated in accordance with the vehicle load (actual slip rate e), the engine power (Tθ) and the lapse time (l) of the clutch ON control, at a given time interval $$\left(\sum_{K=1}^{8} \Delta t\right).$$

Within this time interval $$\left(\sum_{K=1}^{8} \Delta t\right),$$

the clutch ON controlling data is updated at a subdivided time interval or subinterval of Δt. Accordingly, the slip rate of the clutch is properly controlled and changes smoothly and rapidly in accordance with the driving condition of the vehicle, the traffic condition on the road and the lapse of the time. This eliminates any sudden change in the speed of the vehicle and also eliminates an engine blow or stop, assuring a very smooth automatic clutch ON control. Similarly, the application of the engine brake is automatically, smoothly and rapidly controlled. No engine blow or stop is caused by frequently switching the shift lever position between the drive D and the reverse R position within a short interval as when getting the vehicle out of a mire, moving past an obstacle on the road or turning through a narrow T curve. A temporary clutch activation over a prolonged period of time is enabled by a manual operation as when going through a congested traffic condition.

While an embodiment of the invention has been shown and described above, it should be understood that the invention can be carried out in other manners as well. By way of example, the throttle opening sensor 12 may be replaced by a potentiometer, contact electrode or absolute rotary encoder employing a photo-interrupter, and if required, may be combined with an A/D converter for purpose of digital conversion. The only requirement is that the sensor be capable of converting a throttle opening or any associated physical quantity into an electrical signal. The same is true for the detection of the rotational speed of the drive shaft and the driven shaft of the clutch. In this instance, a photo-encoder or tachometer may be used. Alternatively, the pulse counter may be replaced by an integrating circuit, and the resulting analog speed signal converted by means of an A/D converter. Also, in the electronic control system, the microprocessor unit 94 may be replaced by a combination of ROM and a counter circuit which sets up an address, with the read-out of data from the ROM being controlled by means of logical gates, flipflops and counters.

What we claim is:

1. An automatic clutch control system for a vehicle including a clutch having a drive shaft and a driven shaft, said system comprising:
   first speed detecting means for detecting the rotational speed of said drive shaft of said clutch;
   second speed detecting means for detecting the rotational speed of said driven shaft of said clutch;
   means for detecting the throttle opening of an engine on said vehicle;
   clutch engagement control means for controlling the degree of engagement of said clutch in response to clutch engagement control signals; and
   electronic control means connected to said first speed detecting means, said second speed detecting means, said means for detecting the throttle opening and said clutch energizing means, and responsive to the rotational speed of said drive shaft, the rotational speed of said driven shaft and the throttle opening for generating and applying a clutch engagement control signal to said clutch engagement control means, said electronic control means including memory means for storing a plurality of clutch engagement control data groups and said electronic control means including means for specifying, at the initiation of a given time interval, a particular one of said clutch engagement control data groups in accordance with a ratio of the rotational speed of the driven shaft to the rotational speed of the drive shaft and in accordance with the throttle opening, said electronic control means further including means for generating a sequence of clutch engagement control signals corresponding to respective data of the particular group and for applying said sequence of clutch engagement control signals to the clutch engagement control means at subintervals representing a time division of said given time interval.

2. An automatic clutch control system as set forth in claim 1, wherein the system further comprises means for instructing a temporary clutch activation control mode, and wherein said electronic control means increases the duration of said subinterval when said means for instructing a control mode instructs said temporary clutch activation control mode.

3. A method of operating an automatic clutch control system in a vehicle having an engine with a throttle, said system including a shift lever having a neutral position and at least one run position, a clutch having drive and driven shafts, first speed detecting means for detecting the rotational speed of said drive shaft, second speed detecting means for detecting the rotational speed of said driven shaft, throttle detecting means for detecting the opening of a throttle valve, position detecting means for detecting the position of said shift lever, clutch control means for controlling a degree of engagement of said clutch in accordance with a clutch engagement control signal, and electronic control means for generating said clutch engagement control signal, said method comprising the steps of:

(a) monitoring said shift lever position for a detected change of said shift lever position from its neutral position to its run position;

(b) calculating a ratio of the rotational speed of said driven shaft to the rotational speed of said drive shaft when said change in shift lever position is detected and provided that the rotational speed of the drive shaft is equal to or greater than a first preset speed value, and applying to said clutch control means a clutch engagement control signal representing a minimum degree of engagement of said clutch when said ratio is equal to or less than a first preset ratio value provided that either the throttle opening is equal to or greater than a first preset throttle value or the rotational speed of said drive shaft is equal to or greater than a second preset speed value;

(c) monitoring said shift lever position and (1) upon detecting that the shift lever is in its neutral position, applying to said clutch control means a clutch engagement control signal instructing the disengagement of said clutch and thereafter returning to said monitoring step described in paragraph (a) above, and (2) applying to said clutch control means a clutch engagement control signal instructing the disengagement of said clutch and returning to said calculating and applying step described in paragraph (b) above when said shift lever is in a position other than its neutral position and said throttle opening is equal to or less than a second preset throttle value, and when said throttle opening exceeds said second preset throttle value, effecting a clutch engagement control over a long time interval by selecting a particular group of clutch engagement control signals having a level change rate which corresponds to the current values of said ratio and said throttle opening and applying to said clutch control means at short time intervals a sequence of clutch engagement control signals from said selected group;

(d) effecting clutch engagement control in accordance with the procedure in the above-described step (c) over successive long time intervals while continually updating said clutch engagement control signals until a clutch engagement control signal is applied to said clutch control means indicating a maximum degree of engagement of said clutch, and thereafter ceasing the updating of said clutch engagement control signals, monitoring said shift lever position and returning to said monitoring step described in paragraph (a) above if said shift lever is detected in its neutral position, and monitoring the throttle opening and generating a clutch engagement control signal indicating disengagement of said clutch and returning to step (b) above when the throttle opening is equal to or less than said second preset value;

(e) when said ratio exceeds said first preset ratio value, comparing said ratio to a second preset ratio value and advancing to step (c) if said ratio is equal to or less than said second preset ratio value, and effecting a vehicle braking mode of clutch control over further long time intervals if said ratio exceeds said second preset ratio value, said step of effecting a vehicle braking mode comprising specifying a particular group of clutch engagement control signals having a signal level change rate which corresponds to said ratio and applying to said clutch control means at short time intervals a sequence of clutch engagement control signals from said specified group while continually updating said clutch engagement control signals until a clutch engagement control signal has been applied which indicates a maximum degree of engagement of said clutch, and thereafter ceasing the updating of said clutch engagement control signals and monitoring said shift lever position, the throttle position and the rotational speed of said drive shaft and returning to step (a) and generating a clutch engagement control signal for disengaging said clutch if said shift lever is detected in its neutral position or if the throttle opening and rotational speed of said drive shaft are not within given limits.

4. A method according to claim 3, further including the steps of selecting a temporary clutch activation control mode and, in response to selection of said temporary clutch activation control mode, increasing the length of said short time interval at which said clutch engagement control signals are sequentially supplied to said clutch control means.

5. A method according to claim 4, further comprising resetting said control mode to disable said temporary clutch activation control mode after said vehicle braking mode of clutch control has been established.

* * * * *